United States Patent
Somanache et al.

(10) Patent No.: US 8,806,112 B2
(45) Date of Patent: Aug. 12, 2014

(54) META DATA HANDLING WITHIN A FLASH MEDIA CONTROLLER

(75) Inventors: Vinay Ashok Somanache, Pune-Maharashtra (IN); Michael S. Hicken, Rochester, MN (US); Pamela S. Hempstead, Oronoco, MN (US); Timothy W. Swatosh, Rochester, MN (US); Jackson L. Ellis, Fort Collins, CO (US); Martin S. Dell, Bethlehem, PA (US)

(73) Assignee: LSI Corporation, San Jose, CA (US)

( * ) Notice: Subject to any disclaimer, the term of this patent is extended or adjusted under 35 U.S.C. 154(b) by 146 days.

(21) Appl. No.: 13/334,599

(22) Filed: Dec. 22, 2011

(65) Prior Publication Data

US 2013/0019051 A1    Jan. 17, 2013

Related U.S. Application Data

(60) Provisional application No. 61/507,659, filed on Jul. 14, 2011.

(51) Int. Cl.
*G06F 13/00*    (2006.01)
*G06F 12/02*    (2006.01)

(52) U.S. Cl.
CPC .... *G06F 12/0246* (2013.01); *G06F 2212/1036* (2013.01); *G06F 2212/1024* (2013.01); *G06F 2212/7207* (2013.01)
USPC ...................................................... 711/103

(58) Field of Classification Search
None
See application file for complete search history.

(56) References Cited

U.S. PATENT DOCUMENTS

| 4,030,072 | A | 6/1977 | Bjornsson | 340/172.5 |
| 4,766,533 | A | 8/1988 | Lahmeyer | 364/200 |
| 5,430,841 | A | 7/1995 | Tannenbaum et al. | 395/164 |
| 5,438,668 | A | 8/1995 | Coon et al. | 395/375 |
| 5,546,552 | A | 8/1996 | Coon et al. | 395/375 |
| 5,619,666 | A | 4/1997 | Coon et al. | 395/384 |
| 5,692,138 | A | 11/1997 | Fandrich et al. | 395/310 |
| 5,802,553 | A | 9/1998 | Robinson et al. | 711/103 |
| 6,157,963 | A | 12/2000 | Courtright, II et al. | 710/5 |
| 6,954,847 | B2 | 10/2005 | Coon et al. | 712/208 |
| 7,149,846 | B2 | 12/2006 | Hetrick | 711/114 |
| 7,664,935 | B2 | 2/2010 | Coon et al. | 712/210 |
| 7,817,767 | B2 | 10/2010 | Tell et al. | 375/376 |
| 7,873,619 | B1 | 1/2011 | Faibish et al. | 707/705 |
| 7,934,052 | B2 | 4/2011 | Prins et al. | 711/103 |
| 7,978,516 | B2 | 7/2011 | Olbrich et al. | 365/185.11 |
| 8,019,975 | B2 | 9/2011 | Brashears et al. | 712/225 |
| 2005/0057973 | A1 | 3/2005 | Khatami et al. | 365/185.33 |

(Continued)

FOREIGN PATENT DOCUMENTS

| WO | WO2008/138249 A1 | 11/2008 | G06F 13/38 |
| WO | WO2010/033455 | 3/2010 | G06F 12/02 |
| WO | WO2011/700526 A1 | 6/2011 | G06F 13/16 |

*Primary Examiner* — Charles Rones
*Assistant Examiner* — Han Doan
(74) *Attorney, Agent, or Firm* — Christopher P. Maiorana, PC

(57) ABSTRACT

A method for handling meta data stored in a page of a flash memory within a flash media controller. The method generally includes (i) defining the meta data on a per context basis, where the context is defined on a per page basis, (ii) when a size of the meta data is less than or equal to a predefined threshold, storing the complete meta data within a structure of the context, and (iii) when the size of the meta data is greater than the predefined threshold, defining meta data pointers within the context.

15 Claims, 12 Drawing Sheets

(56) References Cited

U.S. PATENT DOCUMENTS

| | | | |
|---|---|---|---|
| 2006/0047865 A1* | 3/2006 | Ellis et al. | 710/22 |
| 2006/0294144 A1* | 12/2006 | Shin | 707/104.1 |
| 2007/0094445 A1 | 4/2007 | Trika et al. | 711/113 |
| 2008/0177954 A1* | 7/2008 | Lee | 711/154 |
| 2008/0189485 A1 | 8/2008 | Jung et al. | 711/115 |
| 2009/0164704 A1 | 6/2009 | Kanade et al. | 711/103 |
| 2009/0172259 A1 | 7/2009 | Prins et al. | 711/103 |
| 2009/0172261 A1 | 7/2009 | Prins et al. | 711/103 |
| 2009/0172262 A1 | 7/2009 | Olbrich et al. | 711/103 |
| 2009/0292865 A1 | 11/2009 | Hong | 711/103 |
| 2010/0023682 A1* | 1/2010 | Lee et al. | 711/103 |
| 2010/0070735 A1* | 3/2010 | Chen et al. | 711/206 |
| 2010/0083247 A1 | 4/2010 | Kanevsky et al. | 718/1 |
| 2010/0125579 A1 | 5/2010 | Pardoe et al. | 707/736 |
| 2010/0125702 A1* | 5/2010 | Lee et al. | 711/103 |
| 2010/0262740 A1 | 10/2010 | Borchers et al. | 710/263 |
| 2010/0325094 A1* | 12/2010 | Yang et al. | 707/693 |
| 2011/0041039 A1 | 2/2011 | Harari et al. | 714/773 |
| 2011/0072188 A1* | 3/2011 | Oh et al. | 711/102 |
| 2011/0099341 A1 | 4/2011 | Resnick | 711/155 |
| 2011/0131346 A1 | 6/2011 | Noeldner et al. | 710/22 |
| 2011/0235858 A1* | 9/2011 | Hanson et al. | 382/103 |
| 2012/0066435 A1 | 3/2012 | Colgrove et al. | 711/103 |

* cited by examiner

META DATA HANDLING WITHIN A FLASH MEDIA CONTROLLER

This application claims the benefit of U.S. Provisional Application No. 61/507,659, filed Jul. 14, 2011 and is hereby incorporated by reference in its entirety.

This application is related to co-pending U.S. application Ser. No. 13/332,849, filed Dec. 21, 2011, which is hereby incorporated by reference in its entirety.

FIELD OF THE INVENTION

The present invention relates to flash media systems generally and, more particularly, to a method and/or apparatus for handling meta data within a flash media controller.

BACKGROUND OF THE INVENTION

Flash memory is attractive in a mass-storage environment, since flash memory systems do not have the mechanical delays associated with hard drives. Thus, the flash memory system allows higher performance and commensurately lower cost, power, heating and space usage. Nevertheless, flash memory has not traditionally been used in such environments due to certain technical constraints. The first technical problem is write speed, which may be as slow as one-tenth that of a sequential access on a mechanical hard drive. The slower write speed is due to the fact that data cannot be overwritten on a NAND flash device without a long erase cycle prior to the write. Because the erase cycle directly affects the write performance, most flash designs move the write data to a new location and delay the erase until later. In a busy system, delayed erase cycles can build up until the processor runs out of free flash pages and has to stop to create new ones, which significantly affects system performance. The second technical problem is the specified limit for each flash memory page of 100,000 erase cycles for Single Level Cell ("SLC") devices and 10,000 cycles for Multi-Level Cell ("MLC") devices. The limited number of erase cycles pose particular problems for data centers where unpredictable data streams can result in certain highly-used areas of memory being subject to a large number of erases. The third issue is data loss. Data loss can occur as a result of various factors affecting flash memory, including read disturbs or program disturbs, which lead to the loss of data bits caused by the reading or writing of memory cells adjacent to the disturbed cell. The state of a flash memory cell may also change in an unpredictable manner as the result of the passage of time.

In flash technology, flash management functions are implemented in firmware. Flash management functions include flash buffer management, defect management, and wear leveling. All of the management functions utilize some storage of a flash device for storing interim data or other information utilized by the firmware. The interim data and information utilized by the firmware that is stored in a flash page is generally referred to herein as meta data.

It would be desirable to implement a method and/or apparatus for handling meta data within a flash media controller.

SUMMARY OF THE INVENTION

The present invention concerns a method for handling meta data stored in a page of a flash memory within a flash media controller. The method generally includes (i) defining the meta data on a per context basis, where the context is defined on a per page basis, (ii) when a size of the meta data is less than or equal to a predefined threshold, storing the complete meta data within a structure of the context, and (iii) when the size of the meta data is greater than the predefined threshold, defining meta data pointers within the context.

The objects, features and advantages of the present invention include providing a method and/or apparatus for handling meta data within a Flash media controller that may (i) define meta data information on a per context basis, where contexts are defined on a per page basis, (ii) store the complete meta data information in the context structure when the meta data size is less than or equal to a predefined threshold, (iii) define pointers to the meta data within the context when the meta data size is above a predefined threshold, (iv) distribute meta data with host user data, and/or (v) protect meta data with error correction coding, integrity checking and correction.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

In one embodiment, a system in accordance with the present invention may be designed to operate with various mass storage protocols, including SAS ("Serial Attached SCSI"), FC ("Fibre Channel") and FC-AL ("Fibre Channel Arbitrated Loop), all of which are based on the Small Computer Systems Interface ("SCSI"), and Serial ATA ("SATA") protocols. A person of ordinary skill in the art would be familiar with the mass storage protocols and, therefore, such protocols will not be further described herein. Except where particular protocols are called out, the systems and methods disclosed herein do not depend on the particular protocol being used and are designed to operate correctly with all of the protocols. Moreover, the systems and methods in accordance with embodiments of the present invention may be adapted for use with other similar protocols, either currently in use or yet to be developed, including protocols for enterprise-level applications as well as protocols for other applications, such as end-user. The system described herein includes a novel method and/or architecture for handling firmware data such as the interim data and information utilized by the firmware that is stored in a flash page (e.g. meta data).

Figure 1:
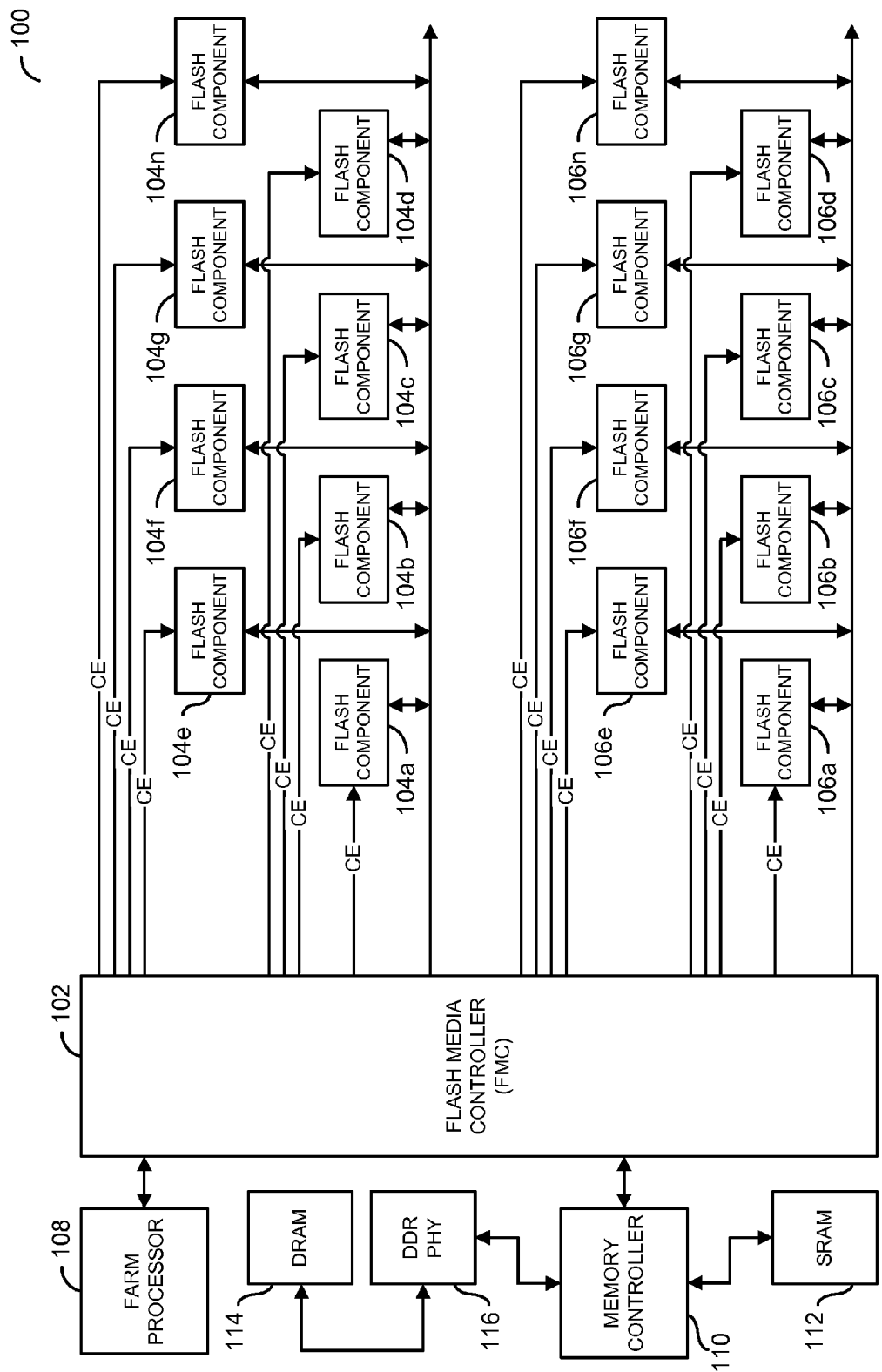
FIG. 1 is a block diagram illustrating a flash media controller implemented in a system on a chip (SOC) context.

Referring to FIG. 1, a block diagram of a system 100 is shown implemented with a flash media controller in accordance with an embodiment of the present invention. In one example, the system (or architecture) 100 may comprise a block (or circuit) 102, a number of blocks (or circuits) 104a-104n, a number of blocks (or circuit) 106a-106n, a block (or circuit) 108, a block (or circuit) 110, a block (or circuit) 112, a block (or circuit) 114, and a block (or circuit) 116. The circuits 102 through 116 may represent modules and/or blocks that may be implemented as hardware, firmware, software, a combination of hardware, firmware and/or software, or other implementations.

In one example, the block 102 may implement a flash media controller (FMC) in accordance with an embodiment of the present invention. The blocks 104a-104n may be implemented as a first number of flash storage devices or components. The blocks 104a-104n may be coupled to a first flash lane of the block 102. The first flash lane of the block 102 may be configured to provide independent chip enable (CE) signals to each of the blocks 104a-104n. The blocks 106a-106n may be implemented as a second number of flash storage devices or components. The blocks 106a-106n may be coupled to a second flash lane of the block 102. The second flash lane of the block 102 may be configured to provide independent chip enable (CE) signals to each of the blocks 106a-106n. Although the FMC 102 is illustrated with two flash lane instances, it will be apparent to those skilled in the art that additional flash lanes may be implemented accordingly to meet the design criteria of a particular implementation. The flash components 104a-104n and 106a-106n may be implemented as a single flash package comprising one or more dies. The flash components 104a-104n and 106a-106n may be implemented using NAND and/or NOR flash devices. The block 102 may include the appropriate physical layer support (PHY) for NAND flash and/or NOR flash.

The block 108 may implement an external FMC processor (FARM) that may be coupled to the block 102. The block 110 may implement a memory controller that may be configured to couple static random access memory (SRAM) and/or dynamic random access memory (DRAM) to the block 102. The block 112 may be implemented as one or more SRAM devices. The block 114 may be implemented as one or more DRAM devices. The block 116 may implement a double data rate physical layer (PHY) interface coupling the block 110 and the block 114. In one example, the blocks 102, 108, 110, 112, 114, and 116 may implement a system on chip (SOC) architecture.

The block 102 may be implemented as a soft IP block configured to assist various applications to use the flash devices 104a-104n and 106a-106n. As used herein, the term soft IP block generally refers to a building block of an integrated circuit that may be provided in software (e.g., HDL Code, RTL code, etc.). The block 102 generally supports multiple flash interfaces with flash devices. The block 102 does not generally include a processor (e.g., ARM). However the block 102 may implement, in one example, an interface (e.g., 32-bit AHE, etc.) configured to couple the block 102 to the external processor 108. The block 102 is generally configured to handle management of a flash media mass storage array formed by the blocks 104a-104n and 106a-106n. In one example, the block 102 may exploit a multiply-instantiated flash lane controller (FLC), which may perform most of the management functions associated with a single flash data lane with multiple independent flash components attached. The function of the block 102 may be somewhat generic in a sense that the block 102 may understand little about flash access. The block 102 is generally more concerned with weaving the flash-aware lanes into a single hardware entity. In one example, the soft IP implementing the block 102 may be parameterized to support the maximum possible lanes for an application. For example, in one implementation the number of lanes may be two. In another implementation the number may be eight.

In one example, the block 102 may support features including: (i) two flash lanes; (ii) up to eight chip enable signals (CEs) on each flash lane; (iii) flash interfaces including asynchronous normal mode, asynchronous extended mode, Toggle 1.0, ONFI 2.1, ONFI 2.3, and Toggle 2.0; (iv) dedicated ECC or shared ECC between multiple lanes that may be hardware configurable (e.g., a parameterized feature of a soft IP block implementing the block 102); (v) 8-bit data on the flash interface; (vi) up to 200 MHz DDR rate on the flash interface in the Toggle 2.0 or ONFI 2.3 flash interface specification; (vii) partial read command, (viii) random read command; (ix) CRC Strip/Insert option on flash Write/Read; (x) up to 64-bit correction for 4K bytes of data; (xi) configurable n-bit correction (max n=64) on 512, 2K, 4K bytes of data; (xii) a 32-bit AHB interface for register programming; (xiii) storage of contexts commands on external memory (e.g., DRAM or SRAM); (xiv) cut-through buffers in flash lane controllers; (xv) independent flash read and write data path to provide better performance; (xvi) in-order status reported per flash unit number (FUN); (xvii) support for one read and one write buffer controller (BC) interface for data path per flash lane; (xviii) support for read BC interface for context retrieval; (xix) support for write BC interface for context update; (xx) support for read/write BC interface for context free resource pointers (CFRP).

Figure 2:
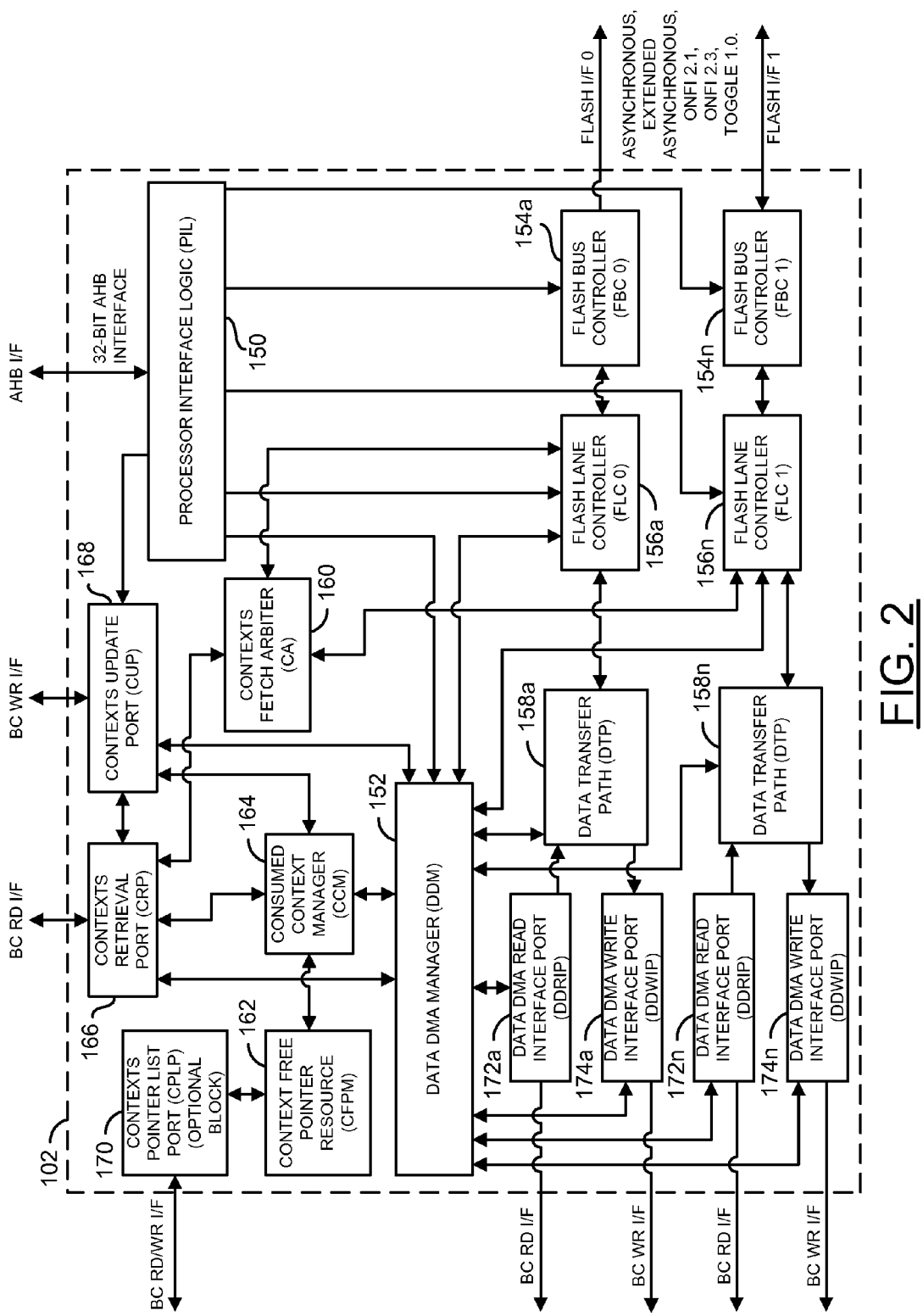
FIG. 2 is a block diagram illustrating an example flash media controller (FMC) architecture in accordance with an embodiment of the present invention.

Referring to FIG. 2, a more detailed block diagram of the block 102 of FIG. 1 is shown illustrating an example flash media controller (FMC) architecture in accordance with an embodiment of the present invention. In one example, the block 102 may implement three major functional interfaces, a buffer controller (BC) interface, a flash device interface, and a processor interface (e.g., 32-bit AHB, etc.). The buffer controller (BC) interface is illustrated on the left side and top-left of the block diagram. In one example, seven buffer controller interfaces (e.g., three read interfaces BC_RD_I/F, three write interfaces BC_WR_I/F, and one read/write interface BC_RD/WR_I/F) may be implemented. The flash device interface is illustrated on the right side of the block diagram. In one example, two flash lane interfaces (e.g., FLASH_I/F_0 and FLASH_I/F_1) may be implemented. The 32-bit AHB interface is illustrated on the top-right of the block diagram. The 32-bit AHB interface may be used, in one example, to program registers, read status and use diagnostic registers within the block 102.

The block 102 generally comprises a block (or circuit) 150, a block (or circuit) 152, a number of blocks (or circuits) 154a-154n, a number of blocks (or circuit) 156a-156n, a number of blocks (or circuit) 158a-158n, a block (or circuit) 160, a block (or circuit) 162, a block (or circuit) 164, a block (or circuit) 166, a block (or circuit) 168, a block (or circuit)

170, a number of blocks (or circuit) 172a-172n, and a number of blocks (or circuit) 174a-174n. The circuits 150 through 174a-174n may represent modules and/or blocks that may be implemented as hardware, firmware, software, a combination of hardware, firmware and/or software, or other implementations. The block 150 may implement a processor interface logic (PIL). The block 152 may implement a data DMA manager (DDM). The blocks 154a-154n may implement flash bus controllers (FBCs). The blocks 156a-156n may implement flash lane controllers (FLCs). The blocks 158a-158n may implement data transfer paths (DTPs). The block 160 may implement a contexts fetch arbiter (CA). The block 162 may implement a context free pointer resource (CFPM). The block 164 may implement a consumed context manager (CCM). The block 166 may implement a contexts retrieval port (CRP). The block 168 may implement a contexts update port (CUP). The block 170 may implement a contexts pointer list port (CPLP). The block 170 is generally optional. The blocks 172a-172n may implement data DMA read interface ports (DDRIPs). The blocks 174a-174n may implement data DMA write interface ports (DDWIPs). Together, the blocks 172a-172n and 174a-174n generally form a data DMA interface port (DDIP).

In one example, the block 150 may provide an interface from the block 108 to addressable resources of the block 102 (e.g., via an AMBA AHB-Lite interface). The block 150 may provide the interface to all addressable resources and direct interface to configuration and status registers of submodules in the block 102 that do not reside within the blocks 156a-156n. The block 150 may also provide an interface to the addressable resources that reside within the individual blocks 156a-156n. In addition, the block 150 may contain a context construction buffer (CCB), where processor firmware may write the actual media context into the block 102 for storage into the system buffer via the block 168. In one example, the block 150 may include the following features: a 32-bit AMBA AHB-Lite slave interface to the block 108, a system clock (e.g., SYS_CLK) that may be some divided value of (or the same as) an incoming clock (e.g., HCLK), access to all configuration and status registers as well as all processor-addressable space in the block 102, the context construction buffer (CCB) used by processor firmware to build contexts that are stored in the system buffer, a processor interface that is distributed to each of the blocks 156a-156n, where access of addressable resources is handled by processor access ports (PAP), and contains registers that may be used by multiple submodules in the block 102. The block 150 may perform all register decoding and all read data multiplexing for all addressable resources not stored logically in the blocks 156a-156n.

The block 152 generally manages two data transfers, one for flash program (e.g., data transaction from a buffer to a flash device) and another for flash read (e.g., data transaction from flash device to a buffer). The DMA data path generally comprises separate 32-bit read and write data busses from the blocks 156a-156n through respective blocks 158a-158n, and the data DMA interface port (DDIP) blocks 172a-172n and 174a-174n. The blocks 158a-158n may contain the ECC function. A DMA data transfer generally comprises a sequence of events that may include multiple accesses to the corresponding context by other sub-blocks (or port blocks) of the block 102. In one example, a DMA transfer may include a FLC request, a retrieve context operation, a data transfer, and a FLC done phase.

In the FLC request step, data transfer may begin with one of the blocks 156a-156n raising a respective request line. In the retrieve context operation, corresponding context may be retrieved from a buffer controller via the context retrieval port (CRP) interface 166. The data transfer may occur among the DDIP, DTP, and FLC blocks, during which the context may be sent to the DDIP and may or may not be written back. In the FLC done phase, a done line to the selected block 156a-156n may be raised to indicate the end of the transfer. The DDM 152 may act to retrieve the context and provide the inputs to the DTP block to facilitate the data transaction.

The blocks 154a-154n generally perform the low-level interface signaling to a set of NAND flash devices on a respective flash lane. There is generally one flash bus controller (FBC) 154a-154n for each flash lane controller (FLC) 156a-156n. The blocks 154a-154n generally manage the timing of each cycle of flash interface protocol for several interface types as well as different timing modes for a given type (e.g., Asynchronous, ONFI 2.0 Synchronous, ONFI 2.3 Synchronous, Samsung Toggle 1.0, Samsung Toggle 2.0, etc). Cycle timing may be controlled, in one example, via timing counts stored in a group of internal timing registers. The core logic of the blocks 154a-154n generally operates in a different clock domain than the rest of the block 102. In general, only the timing register sets reside in the same clock domain as the rest of the blocks 156a-156n. No synchronization logic is generally needed between these registers and the FBC core because the registers are treated as static since the registers are written only when the FBC is quiescent (e.g., no outstanding operations).

The blocks 156a-156n generally perform scheduling of the commands to each die. The blocks 156a-156n manage the sequencing of the commands on each respective flash lane. The blocks 156a-156n provide control and status registers through which firmware may program the die and observe the status. Each of the blocks 156a-156n include context management and die management. The blocks 156a-156n are generally responsible for the processing of the contexts.

Each of the blocks 158a-158n routes data traffic and enables flow control of each interface for data flow in between one of the blocks 154a-154n, an optional internal ECC encoder/decoder, and the respective data DMA interface port (DDIP). In one example, the internal ECC encoder/decoder may be implemented within the blocks 158a-158n. Alternatively, each of the blocks 158a-158n may be configured to share a single ECC encoder/decoder module. The blocks 158a-158n may be programmed for each transfer by both the respective data DMA manager (DDM) module 152 and respective data DMA interface port (DDIP) blocks 172a-172n and 174a-174n. Each block 158a-158n may include independent flash read and write paths, which may operate in a full duplex mode of operation. The blocks 158a-158n maintain current region counts during a data transfer as well as current dword counts within each region. The blocks 158a-158n generally perform flow control translation between the DDIP, ECC encoder & decoder, and FLC blocks. The blocks 158a-158n maintain a running correctable ECC error sum for each transfer and present a final value to the block 152 at the end of a transfer. The blocks 158a-158n may contain the FMC registers used for programming the ECC encoder & decoder. Registers may be accessed via a register interface from the block 150. The ECC module is generally capable of 64-bit correction over 4K bytes of data. However, other levels of correction may be implemented accordingly to meet the design criterial of a particular implementation. In one example, a decoder gate count may be 415K gates and an encoder gate count may be 75K gates.

The block 160 is generally responsible for accepting requests for contexts from the blocks 156a-156n, retrieving the requested contexts from the system buffer (e.g., the DRAM accessed through the buffer controller), then delivering the contexts to the blocks 156a-156n. The retrieval may actually be performed via request to the context retrieval access port (CRP) 166. Contexts are the basic unit of control in the FMC. Contexts generally contain all the information needed by an FLC to execute a command and by the FMC to perform the associated data transfer (DMA) to or from the system buffer. The FLCs act completely autonomously; thus, the FLCs require arbitration for access via the buffer controller to the system buffer, which contains the linked lists of contexts built by the firmware. The block 160 generally provides the arbitration, as well as initiating the request to the block 166. The block 160 then routes the retrieved contexts transparently to the respective FLC destinations. The block 162 is generally implemented as a sub-block of the block 102 to provide a single point where the free pointers are available to firmware.

The block 164 is generally implemented as a sub-block of the block 102 to provide a single point where completed contexts may be inspected by firmware after completion. The block 164 generally performs arbitration among multiple FLC sources. The FLCs provide PASS/FAIL ECC status associated with the context pointer. The block 164 updates the context status field once the context is fetched, then presents the context to the firmware. In the case where the firmware takes a longer time to read the completed contexts and the internal memory within the block 164 is about to become full, the block 164 may use a buffer to store the completed contexts that are enqueued after the current reported context.

The blocks 166-174n generally implement apart interface. The port interface may be used to communicate with the buffer controller. In one example, a QBFIFO block may be implemented within the port interface. The following port interfaces may be implemented also as part of the port interface: contexts retrieval port (CRP) 166, contexts update port (CUP) 168, contexts pointer list interface port (CPLIP) 170 (optional), data DMA read interface port (DDRIP) 172a-172n, and data DMA write interface port (DDWIP) 174a-174n. In one example, the interface signals of the block 102 may be grouped into four major interfaces: a AHB interface, a buffer controller interface, a NAND and/or NOR flash physical layer (PHY) interface, and a miscellaneous (MISC) interface. The buffer controller interface may comprise (i) DDIP BC write interfaces for lane 0 & lane 1, (ii) DDIP BC read interfaces for lane 0 & lane 1, (iii) a CRP BC read interface, (iv) a CUP BC write Interface, and (v) a CPLIP BC read/write interface.

In one example, the block 102 may be implemented with three clocks. The majority of the logic in the block 102 may operate on a clock domain called system clock (e.g., SYS_CLK). The system clock may be the AHB clock. The system clock generally has a frequency that may be one-half of the operating frequency of the FMC Processor (FARM) 112. The second clock may be called the flash clock (e.g., FBC_CLK). The flash bus controllers (FBCs) 154a-154n may operate completely on the flash clock domain. In one example, first-in first-out buffers (FIFOs) may be implemented in a Dataflow Manager (DM) module of the blocks 154a-154n to manage the frequencies between the clocks FBC_CLK and SYS_CLK. The third clock may be the buffer controller clock (e.g., BC_CLK). All interface ports with the BC are operating on the buffer controller clock domain. A buffering element (e.g., QBFIFO) may be implemented between the buffer controller clock BC_CLK and the system clock SYS_CLK.

Figure 3:
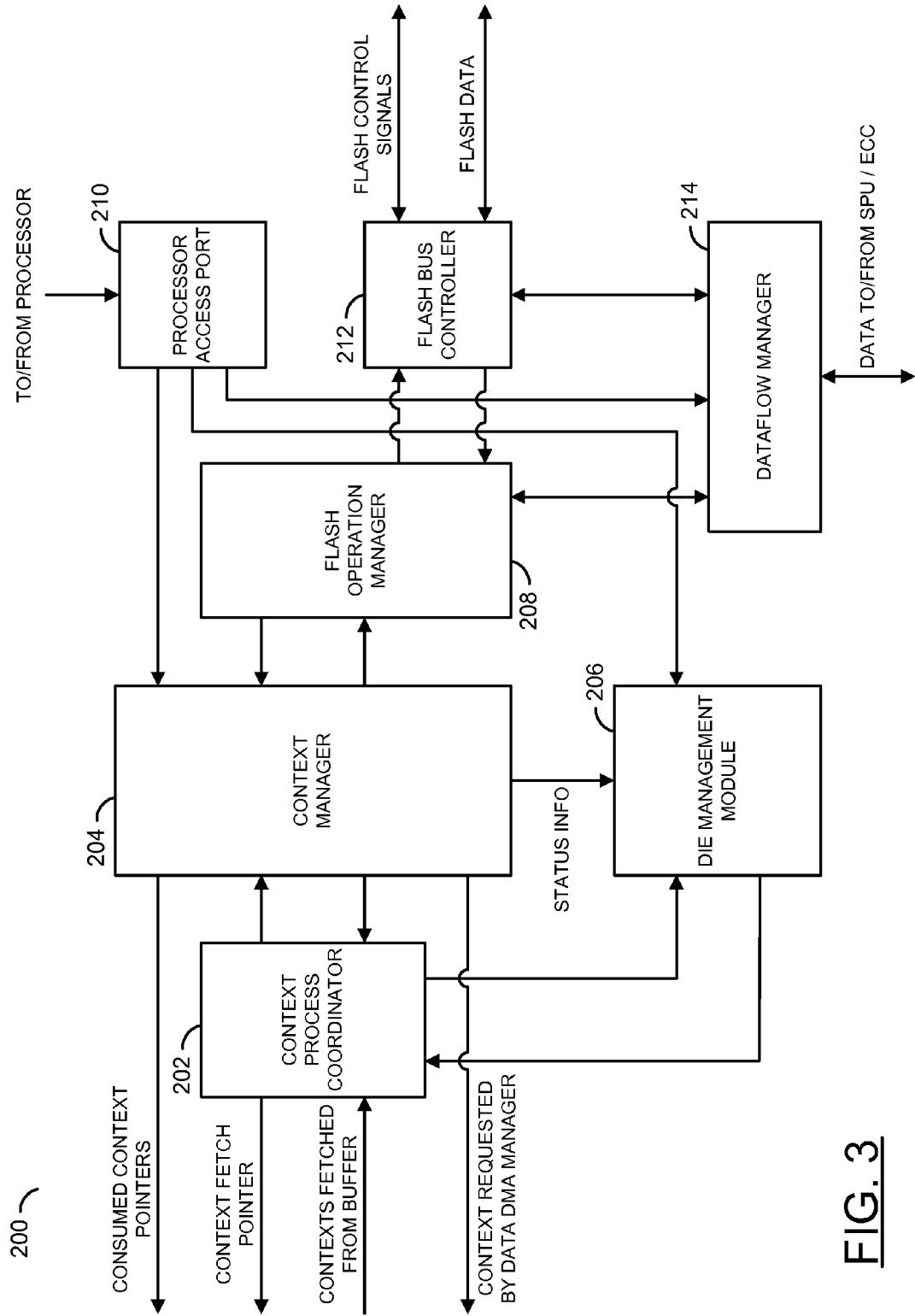
FIG. 3 is a block diagram illustrating an example flash lane controller architecture in accordance with an embodiment of the present invention.

Referring to FIG. 3, a diagram of a block 200 is shown illustrating an example flash lane controller architecture in accordance with an embodiment of the present invention. The block 200 may be used, in one example, to implement the blocks 154a-154n and 156a-156n in FIG. 2. In one example, the block (or circuit) 200 may comprise a block (or circuit) 202, a block (or circuit) 204, a block (or circuit) 206, a block (or circuit) 208, a block (or circuit) 210, a block (or circuit) 212, and a block (or circuit) 214. The circuits 202 to 210 may represent modules and/or blocks that may be implemented as hardware, firmware, software, a combination of hardware, firmware and/or software, or other implementations. The block 202 may implement, in one example, a context process coordinator (CPC). The block 204 may implement, in one example, a context manager (CM). The block 206 may implement, in one example, a die management module (DMM). The block 208 may implement, in one example, a flash operation manager (FOM). The block 210 may implement, in one example, a processor access port (PAP). The block 212 may implement, in one example, a flash bus controller (FEC). The block 214 may implement, in one example, a data flow manager (DFM).

The block 202 may assist in the flow of context information into and out of the block 200. Context flow may be initiated by the block 204. The block 202 is primarily concerned with responding to the requests to acquire or dispose of contexts. To acquire contexts, the block 202 responds to the request for a new context by the block 204. First, the block 202 may initiate a request to the block 206, which arbitrates among the die managed by the block 200 and forwards the context for the selected die or logical unit number (LUN) to the block 202. The block 202 then issues a fetch to the context fetch arbiter (CFA) (e.g., block 160 in FIG. 2), which attempts to retrieve the context from the system buffer.

Once fetched, the context is delivered to the block 202. The block 202 performs some interpretation on the context and forwards the context to the block 204. If the block 206 does not have a die (LUN) available to initiate a context execution, the block 206 informs the block 202 of the lack of an available die, and the block 202 communicates the lack of an available die back to the block 204. The block 202 also assists the block 200 in the disposal of completed contexts. Again, it is the block 204 that initiates this flow, and the block 202 that issues the disposal message to the block implementing the consumed context manager (CCM) (e.g., block 164 in FIG. 2). When the disposal message has been received and acted upon by the CCM, the block 202 informs the block 204, which may then continue context process execution.

The block 202 generally performs some interpretation of the contexts. Specifically, the block 202 may interpret contexts for the purpose of determining whether a context is a Processor Control Mode (PCM) context. When a PCM context is received, context fetching (appending) should cease. The block 202 then waits for the block 204 to begin executing the PCM context and resumes "standard" operation when the processor control mode is completed. During the processor control mode interval, the block 202 determines whether fetched contexts are full 15 dword contexts instead of 4 dword flash contexts, which the block 202 sends to the block 204 in "standard" operation.

The block 204 may, in one example, comprise a context state machine (CSM), a context fetch manager (CFM), a context disposal engine (CDE), and a context interpreter (CI). The block 204 is generally responsible for managing the contexts that are actively being processed by the block 200. The block 204 generally performs the "bookkeeping" of active contexts. Contexts are data structures that provide all the information needed by the flash media controller (FMC) to execute flash transactions and DMAs to the system buffer.

The block 204 manages the contexts at the level of the flash lane controller and thus is primarily concerned with the context management as it relates to the flash transaction. The block 204 maintains the information used by the block 208 to perform commands and data transfers to the flash dies on the flash lane.

The block 206 is generally responsible for maintaining die-based information needed for operation of the block 200. The block 206 manages per-die information in the die management table and arbitrates among the dies for access to be queued to the context table. The block 206 may include, in one example, a die state machine to update a die state. The block 206 may perform/monitor multi-die operations. The block 206 is generally responsible for flash commands including, but not limited to READ, COPYBACK READ/COPYBACK WRITE, BLOCK ERASE, PAGE PROGRAM, and Target level commands including, but not limited to READ ID, READ PARAMETER PAGE, GET FEATURES, SET FEATURES, SYNCHRONOUS RESET, and RESET.

The block 208 generally handles the sequencing of each flash operation applied to the flash lane. One block 208 is generally implemented for each flash lane controller (FLC) of the flash media controller. The block 208 arbitrates between the commands in the context table in the block 204, and applies the commands to the block 212. In one example, the block 208 natively supports the most common commands from the ONFI 2.0 command list, as well as some specific (and similar) commands found in the Samsung NAND flash devices. In addition, other existing and future commands may be supported via a nano-sequencer (described in more detail below in connection with FIGS. 9-11). Natively supported commands are run without processor intervention, but other commands generally use some level of processor support.

The flash commands may be broken down into atomic "cycles" that may be applied serially to the actual flash dies controlled by the block 208. Because the flash commands typically involve long wait times (e.g., a page read may take 25 μs before the data are available to be read from the chip), the "command cycles" may often be run "back to back" to different die on the flash lane, thus cutting down the effective, cumulative wait times. The block 208 generally manages the flash die by updating the status of the die as each flash "cycle" is applied. The block 208 then reads the updated context table to decide what "cycle" should be (or can be) executed next. A NAND flash operation generally consists of one or more flash cycles. There are generally four types of flash cycles: Command, Address, Data Output (w.r.t. flash device—e.g., a read), and Data Input (w.r.t. flash device—e.g., a write). The cycle types roughly translate to the operation types defined between the block 208 and the block 212.

The block 210 generally implements an interface block that provides processor access from the AHB-Lite slave interface of the FMC 100 to the addressable resources inside the block 200. Most of the resources addressed here are accessible primarily for diagnostic purposes, as all configuration signals are presented at the global level (as part of a shared configuration registers block). For example, full access to the flash lane data buffers may be available through the block 210. The access may be provided purely as an early verification scaffold. However, access to the flash lane data buffers may also support firmware patches that need direct access to internal tables. Such accesses may be provided through the block 210.

Features of the block 210 may include: a simple access interface that follows the AHB-Lite slave protocol and is buffered by the Processor Interface Logic (PIL) in the FMC; read and write access provided to register resources, context table, context cache, and die management table; read and write access provided to the flash lane data buffer memory resource, located in the block 214. The block 210 generally supports an ability to add per-lane configuration registers, though most configuration registers are generally provided as inputs to the block 200. Similarly, status and interrupt register access may be supported, though most status and interrupt registers are generally generated outside the block 200. The primary logic groups of the block 210 may include: Interface Manager (IF MGR), Dataflow Manager Interface (DM_IF), Register Block Decoder (REG_DEC), Register Block Multiplexer (REG_MUX), Interrupt Handler (INT_HND), and FLC Global Registers (GLOB_REGS).

Figure 4:
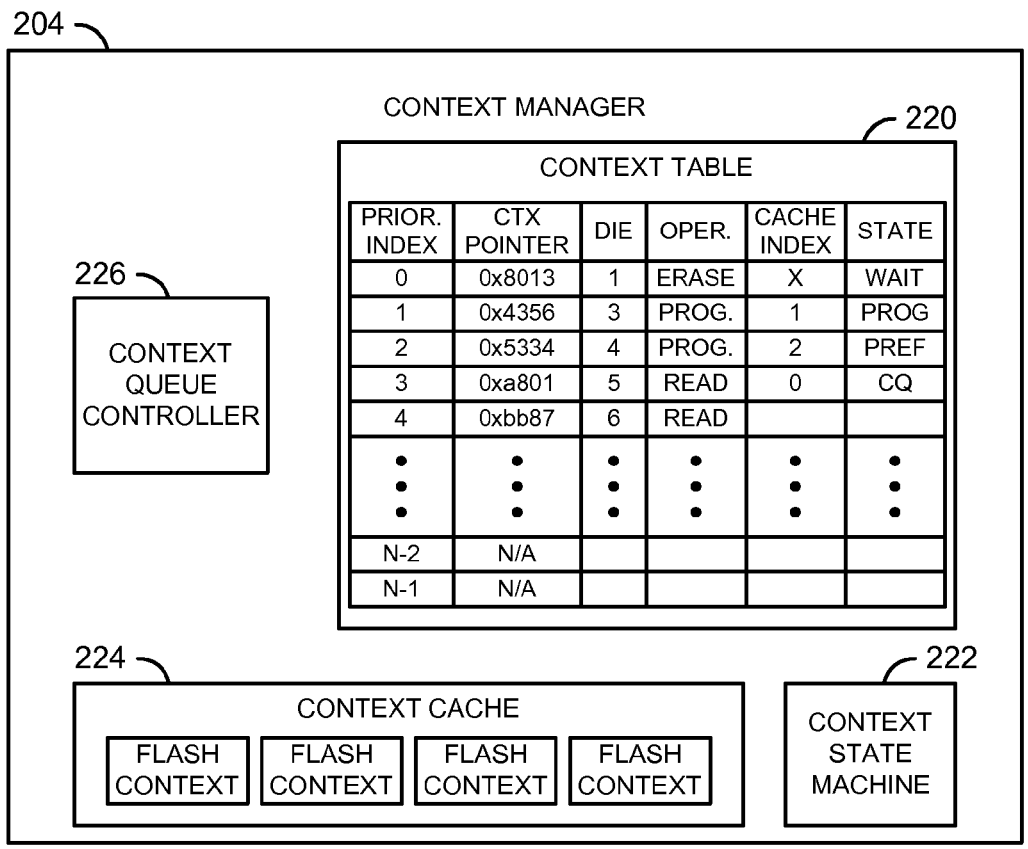
FIG. 4 is a diagram illustrating example submodules of the context manager module of FIG. 3.

Referring to FIG. 4, a diagram is shown illustrating submodules of the context manager module 204 of FIG. 3. In one example, the block 204 may include a context table (CT) 220, a context state machine (CSM) 222, a context cache (CC) 224, and a context queue controller (CQC) 226. The block 204 generally stages and executes phases of operation on the flash lane controller, maintains the priority ordering of all active contexts on the flash lane, maintains the state of each context on the flash lane, provides (e.g., via the context cache) the minimum amount of temporary on-chip storage of contexts needed to execute full transactions, maintains the buffer pointer of each context that is in the process of being executed, and provides agency for each context by determining the next state of the context using the context state machine (CSM) 222. Minimal context information may be maintained in the context table (CT) 220. The context table 220 generally provides a priority queue of contexts currently being executed. The context queue controller (CQC) 226 may be configured to remove completed contexts from the context table 220 and compress the context table 220 to eliminate gaps.

Figure 5:
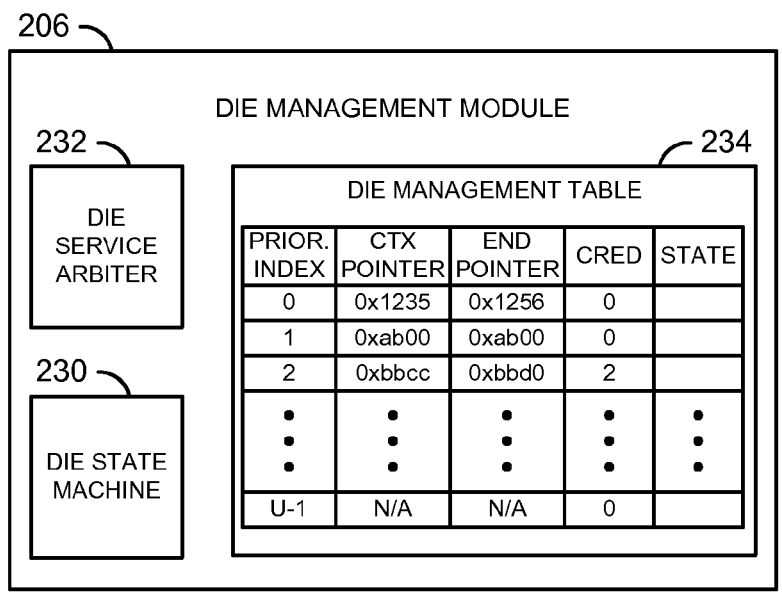
FIG. 5 is a diagram illustrating example submodules of the die management module of FIG. 3.

Referring to FIG. 5, a diagram is shown illustrating submodules of the die management module 206 of FIG. 3. In one example, the block 206 may comprise, a die state machine 230, a die service arbiter 232, and a die management table 234.

Figure 6:
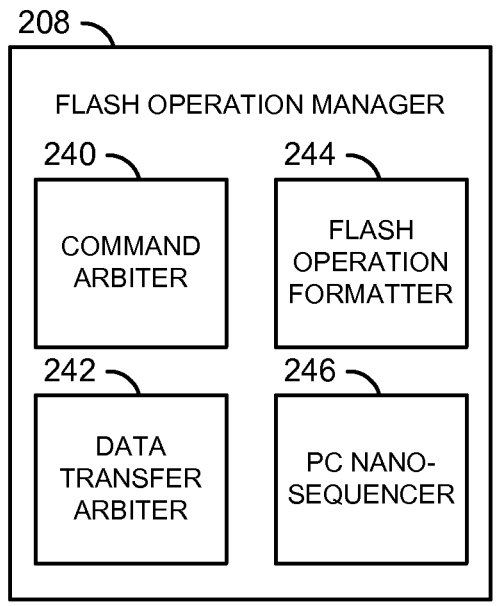
FIG. 6 is a diagram illustrating example submodules of the flash operation manager module of FIG. 3.

Referring to FIG. 6, a diagram is shown illustrating submodules of the flash operation manager (FOM) 208 of FIG. 3. In one example, the block 208 may be divided into four submodules, a command arbiter (CA) 240, a data transfer arbiter (DTA) 242, a flash operation formatter (FOF) 244, and a nano-sequencer 246. The command arbiter 240 generally scans the context table for the commands to apply, and then communicates with the flash operation formatter (FOF) 244 to send the signals to the flash buffer controller (FBC). Once all of the "command" portions have been run, and the flash is ready for a "data phase", the data transfer arbiter 242 initiates a transfer between the FBC and the dataflow manager (DM) 214. Finally, the nano-sequencer 246 interprets special "soft contexts" to apply any command sequence that a flash may require, even if the command sequence is not natively supported.

Figure 7:
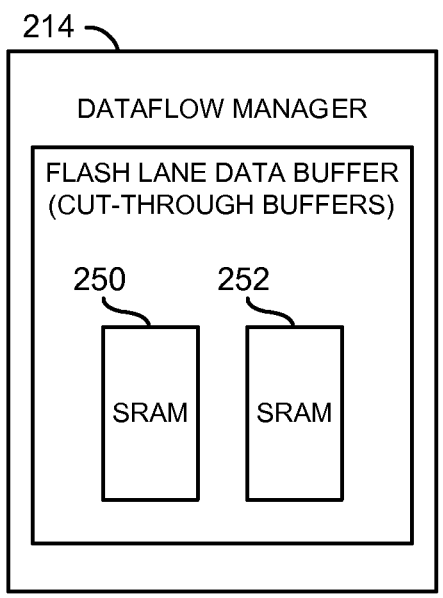
FIG. 7 is a diagram illustrating example submodules of the dataflow manager module of FIG. 3.

Referring to FIG. 7, a diagram is shown illustrating submodules of the dataflow manager 214 of FIG. 3. The dataflow manager 214 generally provides flash lane data buffer memory resources. In one example, the flash lane data buffer memory resources may comprise cut-through buffers 250 and 252. In one example, the cut-through buffers 250 and 252 may be implemented with a size that is programmable. For example, the size of the buffers 250 and 252 may be adjusted to match bandwidth specifications. In one example, the buffers 250 and 252 may comprise static random access memory (SRAM). However, other types of memory maybe implemented accordingly to meet the design criteria of a particular implementation. In general, two cut-through buffers are implemented per flash lane.

Figure 8:
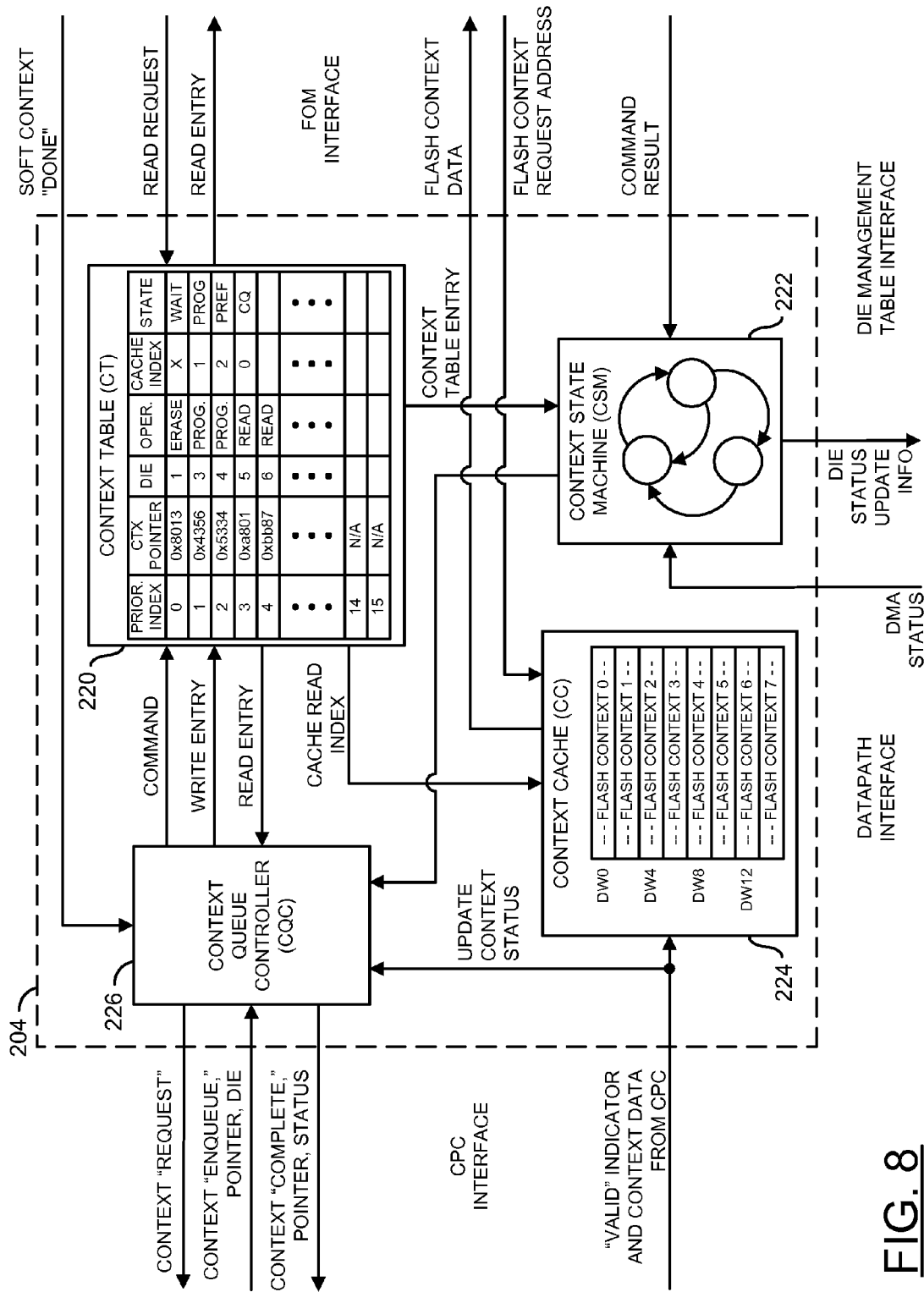
FIG. 8 is a diagram illustrating an example implementation of the context manager module of FIG. 3.

Referring to FIG. 8, a diagram is shown illustrating an example implementation of the context manager (CM) 204 of FIG. 3. The context manager (CM) 204 is generally responsible for managing the contexts that are actively being processed by the respective flash lane controller (FLC). The CM 204 generally performs the "bookkeeping" of active contexts. As stated previously, contexts are data structures that provide all the information used by the flash media controller (FMC) 102 to execute flash transactions and DMAs to the system buffer. The CM 204 manages the contexts at the level of the FLC and thus is primarily concerned with the context management related to the flash transaction. The CM 204 maintains the information used by the flash operation manager (FOM) to perform commands and data transfers to the flash dies on the flash lane.

The CM 204 is generally configured to (i) stage and execute phases of operation on the respective flash lane controller, (ii) maintain priority ordering of all active contexts on the respective flash lane, (iii) maintain the state of each context on the respective flash lane, (iv) provide the minimum amount (or minimize the amount) of temporary on-chip storage (e.g., via the context cache 224) of contexts used to execute full transactions, (v) maintain the buffer pointer of each context that is in the process of being executed, (vi) provide agency for each context by determining the next state of the context using the context state machine (CSM) 222, and (vii) maintain minimal context information in a priority queue of contexts currently being executed (e.g., the context table 220). The context queue controller 226 is generally configured to remove completed contexts from the context table 220 and compress the context table 224 to eliminate gaps.

The context queue controller (CQC) 226 is the logic block that performs modifications on the context table (CT) 220. The CT 220 may be implemented, in one example, as a block of registers that is organized into one entry per enqueued context. The CQC 226 is the block that performs the operations on the table, which is organized as a priority queue. The CQC 226 generally initiates and executes context processes and is responsible for executing the processes on the context table. The main processes generally include Append, Wait, Modify, Dispose, and Compress. The processes are staged and executed by the CQC 226.

The append phase is the phase in which new contexts are fetched by the FMC, and entries for those contexts are added to the context table 220. The CQC 226 inspects the contents of the flash context and the context information presented by the CPC 202 and appends and creates an entry based on the contents and context information. In one example, the context table entry may comprise a bit (or flag) indicating whether a context table entry is active, a value representing the context state, a value representing the context cache index, a value presenting the flash operation, a value representing the flash die, a context pointer, a bit (or flag) indicating whether to disable data transfer and a value representing a plane address. New entries generally begin with the "active" bit set (e.g., a logic '1') and the "context state" set to a value "QUEUED." If the flash operation is illegal, the initial state may be set to a value "ILLEGAL," and the context table entry may be removed during the disposal phase. The other fields are generally determined by the context and the information provided by the CQC 226. New entries are generally appended to the tail of a compressed context table 220. Thus, the CQC 226 is generally aware of the depth of the context table 220.

The CQC 226 generally exits the "append" phase when the CQC 226 is no longer waiting for outstanding data transfers to complete and the CQC 226 has attempted at least one append operation during the given flash operation cycle. The CQC 226 may also leave the "append" phase when there is no longer any space available in the context table 220 or the context cache 224.

The context manager 204 may or may not be forced to wait between full flash operation cycles. The context manager 204 generally has the ability to enforce a minimum flash operation period (e.g., via a flash operation period register). Such a minimum period is desirable for cases where, for example, the flash lane is largely idle except for polling after PROGRAM or ERASE commands. In such instances, the context phases take a very short time to execute, as there are no appends or disposals. Thus, there would be a tendency for the lane to exist in a state where the lane is continuously polling flash die that are busy, thereby consuming power on the flash interface when that power consumption is not warranted. The CQC 226 generally remains in the wait phase until a predetermined time has expired (e.g., a time may be specified in a "flash operation timer" register). When the predetermined time has expired, the CQC 226 may enter the "modify" phase.

The next phase initiated by the CQC is generally the "modify" phase. In the modify phase, the context table 220 is modified based on flash operations performed by the flash operation manager (FOM) and also by results from datapath transfers. The updates are generally related to the state of the context and are thus generally initiated by the context state machine (CSM) 222. When a state update occurs, the CSM 222 sends the updated state and context table index to the CQC 226. The CQC 226 then updates the entry in the context table 220. The modify phase ends when the FOM is done with its cycle of flash interface processes. The FOM may inform the context manager 204 that the flash interface processes are done by asserting a signal (e.g., FOM_CM_FLASH_PROC_CMPLT). Once the modify phase has completed, the CQC 226 may perform the disposal, compression, and appending of contexts on the context table 220. During this time, the context table 220 is inaccessible to the FOM. The CQC 226 may enforce the context table 220 being inaccessible to the FOM by deasserting a signal (e.g., CM_FOM_CT_VALID) indicating to the FOM that the context table read entry and the context cache read data are valid during the particular clock cycle.

When the modify phase has completed, the CPC 202 initiates the "disposal" action. The disposal action puts the CQC 226 into a mode where the CQC 226 searches the context table 220 looking for entries that have completed execution. The CQC 226 bases the decisions of whether entries have completed execution on the states of the contexts. When the contexts are in a "completed" state, the context may be disposed of by the CQC 226. In one example, a context may be in a state in which the CQC 226 is awaiting notification from the datapath as to the completion status of the context. For example, in the case of a READ operation, the context may be in the DATA_TRANSFER_DONE state and awaiting the result of the ECC check. In this case, the CQC 226 may temporarily suspend the disposal process and wait for the status to be returned from the datapath. During this time, the CQC 226 may allow "appends" to occur. Once the awaited status is returned, however, the context may be disposed of by the CQC 226, and the consumed context record may be forwarded to the CPC 202 (and ultimately to the consumed context manager (CCM) 164).

When the CQC 226 has disposed of a context, the CQC 226 clears the "active" bit for the corresponding entry in the context table 220. The process continues until the CQC 226 has reviewed every context in the context table 220. When the CQC 226 reaches the end of the active contexts in the context table 220, the disposal phase is completed.

Contexts that have been disposed of by the CQC 226 have the "active" bits in the respective table entries cleared. Without a mechanism to shift the table up to fill in the holes, the active entries would become disbursed (or fragmented) in the context table 220. Disbursed contexts would make the context table difficult to scan and make the "append" phase more complicated. To ensure that the context table 220 maintains its character as a priority queue, the context table 220 may be compressed. In the compression process, when the CQC 226 disposes of a context, the CQC 226 immediately shifts all the entries after the freed entry up by one position. When the process is complete, all of the active entries are at the front of the list in priority order and all of the "holes" have been removed. As is the case with other actions, the CQC 226 asserts a "done" semaphore (or bit) when the compression process is finished. At the end of the last compress phase, the CQC 226 may start the append phase.

The CQC 226 is generally aware of the processor control mode. In the processor control mode, the entire CM 204 suspends standard operation and proceeds in a mode where the operation of the FLC is essentially driven by "soft contexts" that are executed by the nanosequencer 246 inside the flash operation manager 208. The soft contexts are a different size from the standard flash context. In one example, soft contexts may comprise a full fifteen 32-bit double-words, whereas "flash contexts," the portion of the full media context executed by the FLC, generally comprise just four 32-bit double-words.

The processor control mode (PCM) generally begins when a context whose "flash operation" field is set to PROCESSOR_CONTROL_MODE appears at the top of the context queue. In general, there should be no active entries behind the PCM context in the context table 220, as the CQC 226 should suspend retrieval of standard contexts once the CQC 226 enqueues a PCM context. When the PCM begins, the CQC 226 may notify the CPC 202 via a signal (e.g., CM_CPC_PROC_CNTL_MODE). In response to the notification, the CPC 202 may fetch the "soft context" found at the location given in the PCM context. From the standpoint of what is presented to the FOM, the FOM generally has no knowledge of the existence of the PCM context in the context table 220 while the PCM context is behind other active entries in the context table 220. The PCM context entry in the context table 220 presents its "active" bit to the FOM as 0 until the CM 204 is ready for the FOM to begin executing the soft context.

When the FOM begins reading the soft context, the CQC 226 snoops the operations as the operations are presented to the FOM 208 by the context cache 224, where the soft contexts are stored. When an operation involves a DMA context (e.g., Prefetch Data, Set Read Data Buffer, or Dispose of Context Pointer), the CQC 226 co-opts the now-unused storage in the context table 220 and places the pointers in the context table for tracking. When those DMA contexts complete, the FOM 208 notifies the context manager 204, which then disposes of the contexts in the standard fashion.

While snooping, the CQC 226 also looks for "Fetch Next Soft Context" operations. When the CQC 226 finds one, the CQC 226 asserts a signal (e.g., CM_CQC_PCM_NEXT_CONTEXT) to the CPC 202, which fetches the next soft context. When the FOM 208 informs the CM 204 that the soft context execution is complete, the FOM 208 informs the CM 204 on the FOM/CM command interface. The CQC 226 then deasserts a signal (e.g., CM_CPC_PROC_CNTL_MODE) to the CPC, and standard operation continues. In one example, the signal CM_CPC_PROC_CNTL_MODE may be asserted as a level to indicate that the CM 204 has entered the processor control mode and is now ready to receive soft contexts.

Another important function of the CQC 226 is to monitor timeout situations. In one example, the CQC 226 may contain a counter configured to count the number of system clock (SYS_CLK) cycles that the same context table entry has resided at the top (e.g., at entry 0) of the context table 220. If the count value reaches the value of a programmable "timeout" counter, the entry at the top of the context table 220 may be considered to have timed out. When an entry is considered to have timed out, the entry may be removed from the context table 220, and the context pointer returned to the context process coordinator (CPC) 202 on the consumed context interface.

The return status for the context is one of two possible "timeout" statuses. In the first case, the timeout could potentially be due to a situation where another die on the flash lane is busy and is driving down the R/B line. In this case, the status indicates that the timeout could be due to a timeout on another die. In the second case, the die for the context is known to be the culprit. Here, a different status may be returned indicating that the die is the culprit.

The context table 220 is essentially the storage medium of the entries. The depth of the context table is parameterizable. For example, in the case of a chip that can support 16 die per lane, sixteen entries may be implemented. If more than one operation may be managed per die, increasing the depth may be advantageous. The context table 220 has minimal function. Most of the more involved processing on the context table 220 is performed by the CQC 226. However, the context table 220 may be implemented with multiple read interfaces and multiplexing logic for each of the read interfaces. In one example, the context table 220 may be implemented with an interface to the FOM 208 and an interface to the context state machine (CSM) 222 for read accessibility. The context table 220 also may have a read interface to the CQC 226. The context table 220 may be accessed by the processor, as well.

The context table 220 also has the "shift" capability that is used for the compression phase of the table. Aside from that, the CQC 226 may update the context table 220 using a simple write interface. In one example, the context table 220 may be implemented in flip-flops. When the context table 220 is implemented in flip-flops, there is no arbitration required for read access. If the context table 220 increases in size beyond about 1000 flip-flops, the context table 220 may be implemented in a register file or an SRAM, but additional management and access arbitration should also be implemented.

The context cache 224 is another context data storage element similar to the context table 220. The context cache 224 generally contains a parameterizable number of entries. In one example, the number of entries may be eight. However, other numbers of entries may be implemented to meet the design criteria of a particular implementation. For example, the number of entries may be set to one or two more than is actually needed for fully-pipelined operation. The number should generally be set large enough to allow enough space for full "soft contexts" in the processor control mode. As mentioned above, a full context may comprise fifteen 32-bit double-words. A subset of the full media context is referred to as the "flash context." The flash context is generally the first four double-words (or dwords) of the full media context. The four dwords of the flash context generally contain all the information used by the FLC to execute the full operation specified by firmware. During standard operation (e.g., when the FLC is not in the processor control mode), only the first two dwords of the flash context are stored in the context cache 224. The remainder of the flash context is generally stored in the context table 220.

The context cache 224 generally maintains status on each entry. In one example, the status may comprise a bit indicating whether the entry is FREE or USED. In one example, eight such bits may be implemented in the context cache 224. When a flash context is written to a location in the context cache 224, the status of the location becomes USED. When the CQC 226 receives information on a state change that allows that location to clear, the state of the location returns to FREE. During standard operation, the context cache 224 notifies the CQC 226 that the context cache 224 has space for a free entry based on the status bits. If there is a free location, the CQC 226 is free to request a context from the CPC 202. When the CPC 202 has fetched a new flash context, the CPC 202 presents the flash context to the context cache 224 as a burst of 32-bit double-words of data. A signal (e.g., CPC_CM_ENQ_CTX_VALID) may be asserted when the data is valid. The context cache 224 writes the data into the free location. The context cache 224 expects that the CPC 202 will only write one flash context.

In the processor control mode, which is entered when the entry at the top of the context table 220 is indicated as a PROCESSOR_CONTROL_MODE operation, the context cache 224 should be completely free. In the processor control mode, the context cache 224 should expect to receive a soft context from the CPC 202. The context cache 224 may also expect the soft context to include 15 dwords. Essentially, the context cache 224 acts as a slave, accepting any data presented by the CPC 202. It is the responsibility of the CPC 202 to write the proper amount of data to the context cache 224. The context cache 224 is accessible by the FOM 208, which uses the full flash context information when performing the actual command on the flash unit. The FOM 208 provides an address to a 32-bit double-word, and the context cache 224 responds with the requested double-word on the following clock cycle. During the processor control mode, read responses from the context cache 224 are snooped by the context queue controller (CQC) 226, which may perform actions based on the contents of the operations. The context cache 224 may also be accessible by the processor interface, as is the context table 220.

The context state machine (CSM) 222 is generally configured to determine the execution state of each context in the context table 220 based on the current state of the entry and either the operation being performed by the FOM 208 or the status of a datapath operation. In the modify phase, the CSM 222 is called by the CQC 226 every time the FOM 208 applies a command or returns a result. The contents of the FOM command notification interface and the FOM context table read interface generally provide all the information needed for the CSM 222 to determine the next state.

In the dispose phase, the CSM 222 is called by the CQC 226 when the CQC 226 scans the context table 220 and encounters a context table entry that is in a state in which the context table entry is awaiting action (e.g., a TRANSFER_DATA state or a PREFETCH_DATA state). When the TRANSFER_DATA state or the PREFETCH_DATA state is encountered, the CQC 226 awaits information from the datapath (e.g., either the DM, the DDM, or the DTP) regarding the status of the data transfer. Either way, the CSM 222 is generally called to determine the next state for the context table entry in question. The CSM 222 is also responsible for notifying the die management module 206 when a context table entry moves to a completion state (e.g., COMPLETED or COMPLETED WITH ERROR).

Figure 9:
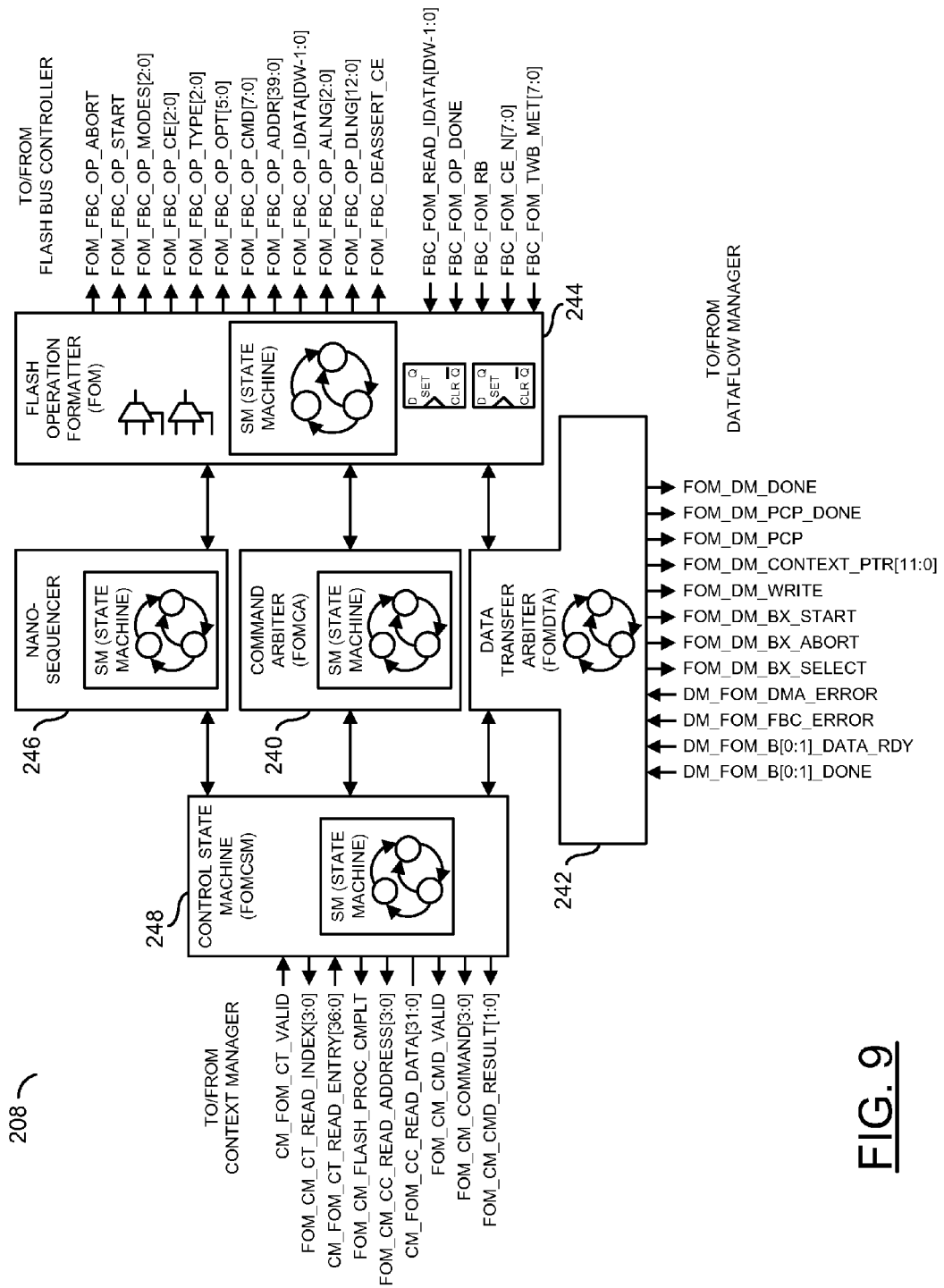
FIG. 9 is a diagram illustrating an example implementation of the flash operation manager of FIG. 3.

Referring to FIG. 9, a block diagram is shown illustrating an example implementation of the flash operation manager (FOM) block 208 of FIG. 6. In one example, the block 208 may be implemented with five submodules. For example, the block 208 may comprise the block (or circuit) 240, the block (or circuit) 242, the block (or circuit) 244, the block (or circuit) 246, and a block (or circuit) 248. The circuits 240 through 248 may represent modules and/or blocks that may be implemented as hardware, firmware, software, a combination of hardware, firmware and/or software, or other implementations. The block 240 may implement, in one example, a command arbiter (CA). The block 242 may implement, in one example, a data transfer arbiter (DTA). The block 244 may implement, in one example, a flash operation formatter (FOF). The block 246 may implement, in one example, a nanosequencer. The block 248 may implement, in one example, a control state machine (FOMCSM).

The data transfer arbiter 242 generally connects the flash operation manager 208 to the dataflow manager 214. The flash operation formatter 244 generally couples the flash operation manager 208 to the flash bus controller 212. The control state machine 248 generally couples the flash operation manager 208 to the context manager 204. The command arbiter 240 is generally connected between the flash operation formatter (FOM) 244 and the control state machine 248. The data transfer arbiter 242 is generally coupled between the flash operation formatter 244 and the control state machine 248. The nanosequencer 246 is generally coupled between the flash operation formatter 244 and the control state machine 248. The command arbiter 240 generally scans the context table in the context manager for the commands to apply, and then communicates with the flash operation formatter (FOF) 244 to send the signals to the flash bus controller (FBC) 212.

Figure 10:
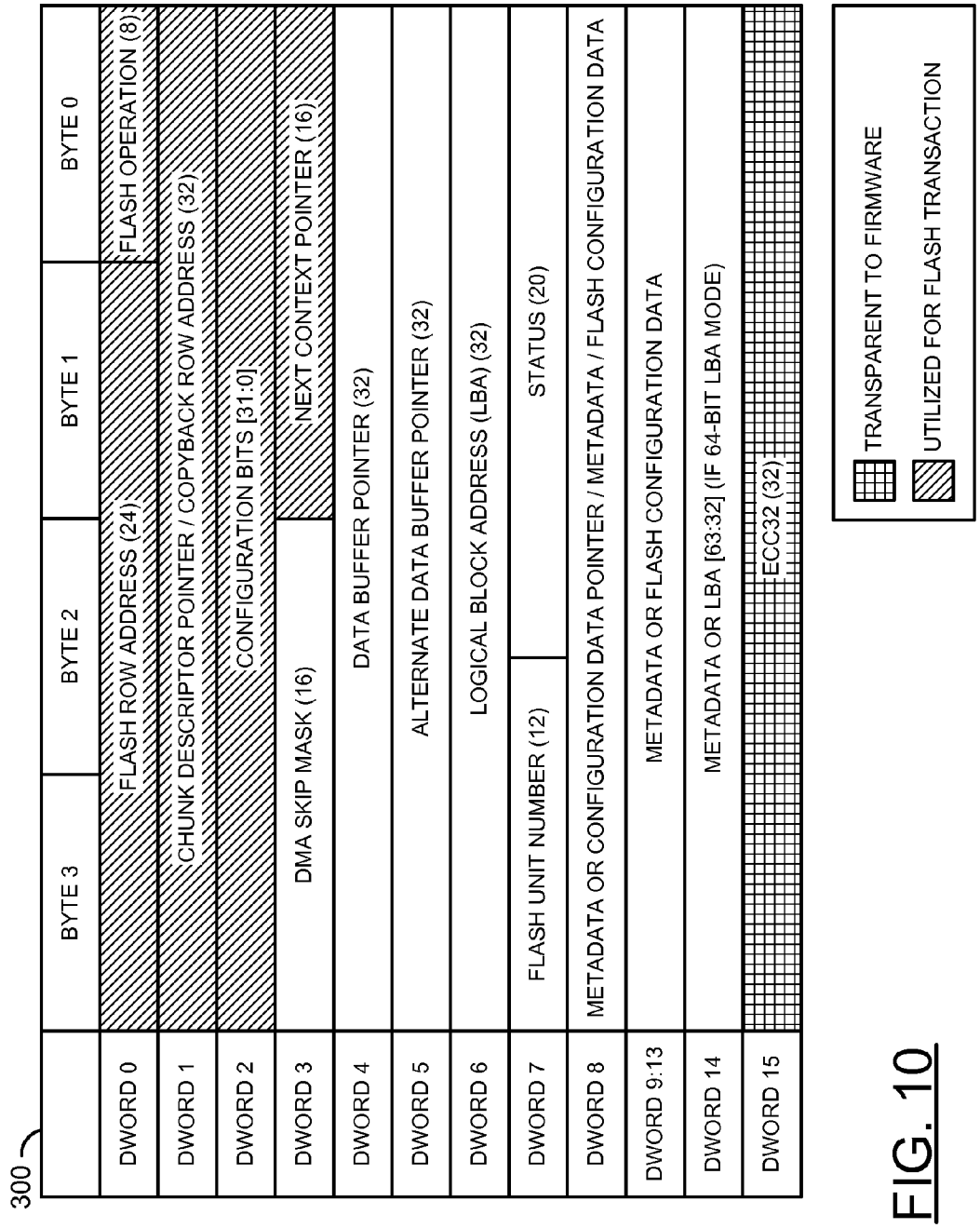
FIG. 10 is a diagram illustrating an example flash media context layout in accordance with an embodiment of the present invention.

Referring to FIG. 10, a diagram is shown illustrating an example flash media context layout 300 in accordance with an embodiment of the present invention. Each flash transaction is generally represented by a context. The context is a data structure that contains all the information used by the system hardware to perform a transaction with a flash bank and/or move data to or from a location in the system buffer. Contexts are generally constructed by firmware and are presented to the flash lane controllers (FLCs) as pointers into the buffer controller (BC) to where the context content is actually located. Firmware may elect to construct linked lists of these contexts (e.g., context lists) in order to allow greater hardware automation of flash operations. There is generally one context list per managed flash unit (e.g., die, LUN, etc.).

In general, during normal operations only a portion of the full context is used by the FLC to execute the flash transaction. Thus, only the portion used by the FLC is stored in the context cache of the FLC. The portion of a full context that is stored in the context cache of the FLC during a normal operation is generally referred to as the "flash context." As can be observed from the flash media context layout 300, the flash context may, in one example, comprise only the first four double-words of the full 15 double-word context.

In one example, contexts implemented in accordance with an embodiment of the present invention may comprise the following contents and/or fields: a flash operation field, a flash row address field, a chunk description pointer/copyback row address field, a configuration bits field, a next context pointer field, a DMA skip mask field, a data buffer pointer field, an alternate data buffer pointer field, a logical block address (LBA) field, a status field, a flash unit number (FUN)

field, a field that may contain either meta data or a configuration data pointer, meta data, and/or flash configuration data, a field that may contain either meta data or flash configuration data, a field that may contain either meta data or an upper portion of the logical block address (LEA) if a 64-bit LBA mode is used, and a field that may contain error correction coding (ECC) for the context. The flash operation field may comprise an operation code. In one example, the operation code may comprise eight bits. The operation code may be generated by the firmware to communicate to the hardware the operation to execute. Generally, the operation involves at least one access to the flash array. The basic operation codes available to the firmware may comprise values representing operations including, for example, RESET, SYNCHRONOUS_RESET, READ_ID, READ_PARAMETER_PAGE, GET_FEATURES, SET_FEATURES, READ_PAGE, PROGRAM_PAGE, ERASE_BLOCK, COPYBACK_READ/PROGRAM, READ_STATUS, READ_STATUS_ENHANCED, PROCESSOR_CONTROL_MODE, MULTIPLANE PROGRAM PAGE, and MULTIPLANE PROGRAM END.

The flash row address field may contain the row address of the page of the access in flash memory. In one example, the flash row address field may contain the block address concatenated with the page address. The flash row address may be presented to the flash array during the three (3) row address cycles of an operation. For an erase operations, only the block address of the access in the flash memory is presented. For a READ_ID operation, which uses just one byte of address, the byte may, in one example, be placed in the left-most byte (MSB) of the flash row address. The flash row address field may also be used as a soft context pointer when the flash operation is PROCESSOR_CONTROL_MODE. When a processor control mode operation is encountered, the FLC may use the value in the flash row address field as the system buffer address of the soft context.

The DMA skip mask field may contain bits that allow sectors (regions) of a page to be either forwarded or skipped, based on a state (e.g., '1' or '0') of the bits, when moving the data to or from the system buffer. In one example, the DMA skip mask field may be implemented as an active low skip mask or a forward mask (e.g., a '1' indicating forwarding and a '0' indicating skipping a respective page). The DMA skip mask field may be primarily used o for read/modify/writes (RMW) operations, which are common for transactions of small numbers of sectors. For example, on an 8K page device, a page is normally divided into sixteen (16) sectors. When a particular bit of the DMA skill mask field is a one, the corresponding sector may, in one example, be written to or read from the system buffer. When the bit is a zero, the corresponding sector may be omitted from the write to or read from the system buffer. In one example, there may also be a mode that allows data to be written from two separate sources: a buffer chunk containing unmodified page data and a buffer chunk containing updated page data. For those cases, one state (e.g., '0') may be used to indicate that the sector is written from the chunk containing the updated page data, and the other state (e.g., '1') used to indicate that the sector is written from the chunk containing the unmodified page data. The bit positions may also be significant. For example, the left-most bit (MSB) is generally the bit that corresponds to the first, or lowest-numbered, sector in the page. The right-most bit (LSB) is generally the one corresponding to the highest-numbered sector in the page. If there are fewer than 16 regions in the page, the right-most bits may be treated as don't cares. However, other arrangements may be implemented to meet the design criteria of a particular implementation. In one example, a granularity of the mask may be one (1) information word when Bose Chaudhuri Hocquenghem (BCH) error correction code (ECC) is implemented.

The next context pointer field may comprise a pointer to the next context in a context list (e.g., a linked list of contexts) built by the firmware. If the "next context pointer" is equal to the "end of list pointer" that is programmed by the firmware into the FLC, the hardware may assume the end of a search has been reached. The hardware may wait for the "end of list pointer" value to change before continuing to traverse the linked list. A "null pointer" value may also be defined that would stop a list search by the hardware, as well.

In one example, the chunk descriptor pointer/copyback row address field generally provides the row address of the page of flash memory for the cached data to be written back to for copyback commands. The row address is the concatenation of the block address and the page address. In another example, the copyback flash row address field is shared with unused fields for non-copyback contexts. For example, the chunk descriptor pointer/copyback row address field may used to provide a buffer allocation manager (BAM) assist field. The BAM assist field may comprise a pointer to a descriptor for a data chunk inside the data buffer managed by the buffer allocation manager (BAM).

The chunk descriptor field may be used for cache management. The chunk descriptor may include the chunk address (e.g., in the system buffer), valid bits, dirty bits, transfer pending count, state, LBA, and pointers used in buffer management. The chunk descriptor pointer is generally passed to the BAM by the DMA manager in the flash media controller (FMC) after the DMA has completed. The chunk descriptor pointer may also be passed to the BAM in order to acquire a buffer data pointer to begin the DMA if flag (e.g., a BAM Lookup Required bit) is set. The chunk descriptor pointer/BAM assist field may also be set up by firmware as a generic BAM assist field, and the contents may be determined by firmware depending on the specific programming of the BAM sequencer. In general, the chunk descriptor pointer/BAM assist field is completely transparent to the hardware.

The data buffer pointer field generally provides the pointer to the actual data to be passed to/from the buffer controller from/to the flash media. The data buffer pointer field is either present in the context when the context is initially fetched, or the data buffer pointer field may be populated by the BAM through a BAM lookup if the BAM Lookup Required bit is set. The data buffer pointer field generally provides the address of the first byte in the chunk, not necessarily the first valid LBA in the chunk.

The alternate data buffer pointer field is also a pointer to data being passed to/from the buffer controller from/to the flash media. The alternate data buffer pointer filed is used when the operation uses multiple sources or destinations from or to the buffer. The alternate data buffer pointer may be mainly used for read/modify/write (RMW) operations. When the host performs an operation that is smaller than a full page, the host does an RMW operation to update the page. The alternate data buffer pointer may be used for the read operation to store the old page data in a temporary chunk. Then, when the write operation is performed, the skip mask may be used to select the write source of the sector (or region) from either the media chunk containing the unmodified page data, or the host chunk containing the data to update.

The meta data field generally comprises the meta data (e.g., management information such as LBA, sequence numbering, bad block indicators, etc.) associated with the flash page. It is generally expected that all meta data will fit inside of a context. If not, a meta data buffer pointer may be included in the context in lieu of the meta data itself so that the meta data may be stored in or retrieved from the system buffer. For writes, the meta data field is generally populated by firmware and inserted by hardware into the page. On reads, it is often desirable for the firmware to request the contents of the meta data from the read page. For these cases, the context may be configured to read the meta data from the page into the context. In one example, the size, in bytes, of the meta data may be determined by a meta data size register.

The flash configuration data field generally shares byte positions with the meta data field and is generally used for operations in which a limited number of bytes is transferred (e.g., READ_ID, GET_FEATURES, SET_FEATURES, READ_STATUS, etc.). Since the number of bytes associated with such transfers is generally small (e.g., SET_FEATURES and GET_FEATURES may use 4 bytes; READ ID generally uses 5 bytes; READ_STATUS may use just 1 byte), the data is simply transferred in the context instead of in a separate buffer location. If the data associated with such a transfer outgrows the space allocated in the context, the flash configuration data pointer field may be used. The GET_FEATURES and SET_FEATURES commands are always assumed to use 4 bytes. The number of bytes needed for a READ_ID command may be obtained, in one example, from a Number of Read Bytes for a READ ID Command register. When the flash configuration data field is used for configuration data, all of the 7 double words are updated by hardware, and the firmware only needs to read the appropriate bytes.

The meta data buffer pointer field comprises the address of the location of page meta data (e.g., management data that is included with user data in the flash page). The meta data buffer pointer field may be omitted for many applications, as it is expected that all meta data may be stored in the context itself. The meta data buffer pointer field may be used when the meta data is to be retrieved from the external system buffer. The meta data buffer pointer field is generally only used if the meta data is stored externally and not in the context. In one example, a configuration bit may be implemented to specify whether meta data is to be stored externally or within the context. In one example, the external system buffer may be implemented as a memory (e.g., a DDR RAM) that is external to the chip containing the flash media controller (FMC). In another example, the external system buffer may be implemented as an on-chip RAM that is external to the FMC IP. In yet another example, the external system buffer may comprise memory that is in the FMC IP. In general, the external system buffer may be any storage that is external to the context.

The flash configuration data pointer field generally provides the address of the location of configuration data that is acquired or needs to be written to a flash unit. The flash configuration data associated with READ_ID, GET_FEATURES, and SET_FEATURES commands may be stored in the context itself, much as the meta data is allocated to context fields for data transactions. However, as in the case of the meta data, if the data size outgrows the space allocated for the flash configuration data in the context, a pointer to the data in the system buffer may be used for access.

The logical block address (LBA) field generally provides LBA of the first data region in the page. The LBA is generally encoded into the data protection for each sector in the system buffer and flash. Since a page is a contiguous group of LBAs, only the first LEA in the group is used as part of the context. The LEA may be used to seed the buffer CRC for the sector page. The LEA may also be selectively checked against the LBA portion of the meta data. For example, a configuration bit may be implemented for selecting whether to check the LEA against the LEA portion of the meta data. For example, the LBA may be checked against the LBA portion of the meta data when the configuration bit is set. In one example, only the low-order 32 bits may be used for seeding.

The flash unit number (FUN) field may be used by the firmware as an identifier to determine the flash unit to which the context is to be applied. The determination is transparent to the hardware. The flash unit number field is used solely by the firmware for management purposes so that the firmware may reconcile the context once the identifier is presented back to the firmware after the context has been consumed by the hardware.

The configuration bits field generally contains all the bits used to configure the context and determine the disposition of the context (and the transfer the context represents) at various points in the hardware flow. In one example, the context bits and fields available in the configuration bits field of the context may include, but are not limited to the following: consumed context manager interrupt enable; a partial commands enable bit, which enables/disables execution of a DMA skip mask feature using partial commands on the flash interface; disable DMA to system buffer; disable any data transfer to or from FLC local buffer; a scrambler function enable, which enables/disables a scrambler function; an ECC error detection interrupt enable; an ECC macro bypass that enables/disables decoding of read data or appending parity to write data; a buffer CRC enable; an ignore meta data signal (bit) that causes meta data to not be forwarded to the system data buffer, the system buffer or contexts on read, and prevents insertion of meta data from any source on writes (e.g., leaves meta data field blank); a signal (bit) to keep meta data with user data for DMAs (e.g., forward meta data to data buffer on reads and accept meta data from data buffer on writes); a signal (bit) indicating whether the "starting LBA" field in meta data is to be checked against the starting LBA field in the context; a signal (bit) indicating whether to keep ECC parity field in buffer (e.g., transfer ECC parity bytes to system buffer on reads, and transfer ECC from system buffer to flash on writes); a signal (bit) indicating whether to use a flat buffer (e.g., transfer data to/from an unmanaged area of memory) instead of a managed data buffer (e.g., may be used to determine how much data is transferred to system buffer in a quantum burst); a signal (bit) indicating whether to use a user data sector length configuration to determine a sector data length (e.g., if the bit is clear, the sector data length may be determined from a reserved area sector length configuration); a signal (bit) indicating whether to transfer flash configuration data (e.g., read flash data into context, or write flash data from context); a signal (bit) indicating whether to transfer a full raw flash page to or from the system buffer; a signal (bit) indicating whether to use the skip mask with an alternate buffer (e.g., causes the skip mask to be used to mark sectors (regions) that are to be transferred to/from the buffer chunk pointed to by an alternate data buffer pointer instead of omitting transfer of the sectors); a field defining the scrambler seed for each region when the scrambler is enabled. The signal indicating whether to transfer a full raw flash page to or from the system buffer is, by its nature, mutually exclusive with most of the other options. The signal indicating whether to transfer a full raw flash page to or from the system buffer generally overrides other bit settings. The feature of transferring a full raw flash page to or from the system buffer generally allows firmware to get at the unused area of a page, which does not belong to any region. The transfer flash configuration data signal may be used for command like ops like READ ID, GET FEATURES, and SET FEATURE. The size of the data may be determined by a configuration data length register. The data would appear in the position in the context normally occupied by the meta data.

The status field generally comprises bits that may be used to present status back to the firmware. In one example, the status field may contain a pass/fail status for program/erase operations. In another example, the status field may also contain the number of errors detected by ECC logic on read operations. However, other uses of the field may be implemented to meet the design criteria of a particular implementation. In one example, the status field may be configured to indicate a number of errors in the flash page and a completion code for the context manager (e.g., Clean, Program/Erase Error, Corrected Read Error, Uncorrectable Read Error, Buffer CRC Error on Prefetch from System Buffer, Operation Timeout, LBA/Metadata Mismatch, Illegal Operation, etc.).

As stated above, a context is a data structure that determines the execution of a command. The context is the unit of communication between the firmware and the hardware. The general context flow may be summarized, with reference to FIGS. 2 and 3, as follows. The firmware writes the context in a context construction buffer (CCB) of the processor interface logic (PIL) 150 of the FMC 102 along with a memory pointer. Multiple contexts may be linked by the firmware in context lists by using the next pointer field within the context structure. The hardware performs a memory write of the context to a location associated with the memory pointer through the contexts update port (CUP) 168. The firmware may enable the execution of the particular die through, for example, die management registers in the die management module (DMM) 206 in the respective flash lane controller (FLC) 156a-156n. A separate set of die management registers may be present for each die. The DMM 206 may communicate information in the registers to the context manager (CM) 204 in the respective flash lane controller (FLC) 156a-156n. The CM 204 may then fetch the enabled context from the memory for processing through the context retrieval port (CRP) 166 and schedule for execution of the command on the respective flash lane bus. The CM 204 generally schedules the command and directs the data DMA manager (DDM) block 152 for data oriented operations. The DDM block 152 generally fetches the context from the memory for extracting data parameters from the context through the CRP 166. Upon successful completion of the context by the DDM 152 and the CM 204, status is updated to the consumed context manager (CCM) 164. Upon completion, an interrupt may be generated by the hardware and the firmware may read the completion status for the given context.

The data DMA interface port (DDIP) comprising the blocks 172a-172n and 174a-174n is generally responsible for real-time data routing between the DTPs 158a-158n, the system buffer controller and the associated context. Each data transfer may comprise one or more regions. Each region may comprise one or more areas. The actual format may be determined by configuration settings from the FMC (e.g., using registers) as well as from the associated context. The settings may be categorized on per-transfer, per-region, and per-area basis. Routing may be determined according to area type of data transfer format as well as additional configuration settings. Routing generally includes padding and stripping functionalites. Each data transfer involves all context dwords. Therefore, the DDM 152 initiates context access with the DDIP, where the DDIP reads all context dwords into its own context cache area prior to actual data movement. Once the associated context is retrieved, the DDIP programs its internal control logic with the appropriate configuration settings, and provides some configuration information to the respective DTP 156a-158n. The DDIP then tracks each area within each region and sets up logic for appropriate routing. During actual data transfer, if data is redirected to a context, then the DDIP switches context access to write mode. When the transfer is complete, the DDIP will notify DDM 152 that both transfer and context access is done. The DDIP may perform error checking. For example, the DDIP may be configured to perform system buffer CRC checking and/or verify that a received LBA matches an expected LBA from a context. Results of these checks as well as system buffer ECC byte error (when enabled) are generally passed back to the DDM block 152. The DDM block 152 may in turn pass the information back to the selected FLC 156a-156n. The DDIP may also be configured to generate and insert the CRC. The entire user data may be constructed by gathering all of the user data bytes from each region. Similarly, the entire meta data may be constructed by gathering the meta data bytes from each region. In one example, the meta data may be gathered until a predefined upper limit is reached. In one example, the DDIP may have a default configuration where the DDIP routes only the used portions of the user data area to/from the system buffer and only the used portions of meta data area to/from the context. The ECC area may be stripped/padded. The default configuration may be modified to provide multiple variations. For example, the DDIP may be configured to (1) keep the entire user data area intact, including unused bytes, (2) keep the meta data area with the user data area to/from the system buffer, (3) strip/pad the meta data area, (4) keep the ECC are intact, and/or (5) keep the entire region intact (e.g., no stripping/padding).

The context layout structure 300 (described above in connection with FIG. 10) may be used for programming any page in a target. An example program data flow between the top modules may be summarized as follows. The firmware programs the context with a program command with associated memory pointer in the CCB within the processor logic interface (PIL) 150. The CCB performs a write operation to the memory through the CUP 168. The firmware enables the DMM 206 within the respective FLC 156a-156n to allow the execution of the context. The CM 204 within the respective FLC 156a-156n fetches the context from the memory through the CRP 166 and processes the portion of context used for scheduling of the command on the respective flash bus controller (FBC) 154a-154n. The FLC communicates with the DDM 152 about the context, the DDM 152 fetches the context through the CRP 166 and provides the pointers of data chunks to the respective DTP block 158a-158n. The respective DTP block 158a-158n requests the data from the memory with the pointers decoded from the context. The request is made through the data DMA interface port (DDIP) formed by blocks 172a-172n and 174a-174n. The data DMA interface port (DDIP) reads the data from the memory in a quantum burst.

Data read from the memory is generally passed to the DTP by the DDIP formed by blocks 172a-172n and 174a-174n. In the DTP, the data may be checked for CRC if enabled, and ECC may be added to the user data if enabled and passed to the respective FLC 156a-156n. If the data integrity fails, the status is updated to the CCM block 164. The flash operation manager (FOM) 208 in the respective FLC 156a-156n schedules the command and data related to the program cycle to the respective flash bus controller (FBC) 154a-154n. The respective FBC 154a-154n executes the program operation on the flash bus interface as per the flash interface specification. The respective FBC 154a-154n reads the status from the flash for completion of, the operation. The respective FBC 154a-154n communicates to the respective FLC 156a-156n and the respective FLC 156a-156n communicates to the CCM 164 on completion of the operation. The CCM 164 asserts an interrupt to firmware to notify the firmware that the context residing in the context register associated with the CCM 164 is complete and ready for the firmware to inspect. The firmware then reads the context from the CCM 164. When the firmware finishes reading and processing the context, the firmware may assert a signal (e.g., a bit) which allows another consumed context to be loaded.

The basic flash read data flow may be described as follows. A context structure is used for reading any page in a target. The firmware programs the context with a read command with an associated memory pointer in the CCB within the processor logic interface (PIL) 150. The CCB performs a write to the memory through the CUP 168. The firmware enables the DMM 206 within the respective FLC 156a-156n to allow the execution of the context. The CM 204 within the respective FLC 156a-156n fetches the context from the memory through the CRP 166 and processes the portion of context required for scheduling of the command on the respective FBC 154a-154n. The respective FLC 156a-156n communicates with the respective FBC 154a-154n for execution of the read command to the target. The respective FLC 156a-156n communicates with the DDM 152 about the context, the DDM 152 fetches the context through the CRP 166 and provides the pointers of data chunks to the respective DTP block 158a-158n.

Upon receiving the data from the flash through the respective FBC 154a-154n to the respective DTP 158a-158n, the respective DTP 158a-158n requests the data to be written in the memory with the pointers decoded from the context. The respective DTP 158a-158n does so through the data DMA interface port (DDIP) formed by blocks 172a-172n and 174a-174n. The DDIP writes the data to the memory in a quantum burst. In the DTP, data is checked for ECC if enabled, and CRC is added to the user data if enabled and the data is passed to the DDIP. If the data integrity fails, the status is updated to the CCM block 164. The status of the read operation is provided to the CCM block 164 upon completion of the operation. The CCM block 164 asserts an interrupt to the firmware to notify the firmware that the context residing in the context register of the CCM block 164 is complete and ready for the firmware to inspect. The firmware reads the context from the CCM block 164. When the firmware finishes reading and processing the context, the firmware may assert a signal (e.g., a bit) which allows another consumed context to be loaded.

Figure 11:
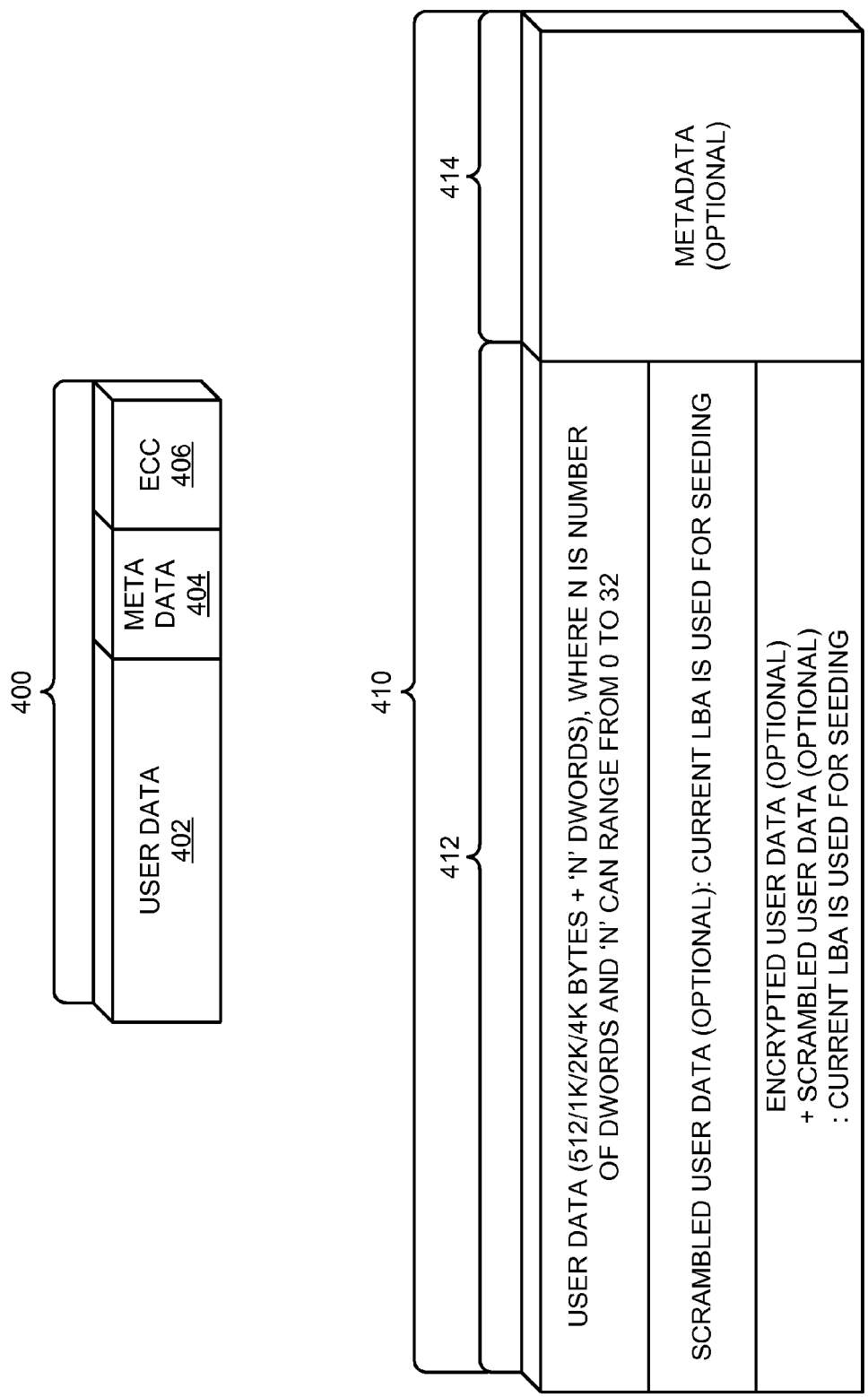
FIG. 11 is a diagram illustrating example region partitions in a flash page in accordance with embodiments of the present invention.

Referring to FIG. 11, a diagram is shown illustrating example region partitions in a flash page in accordance with embodiments of the present invention. NAND flash memory is generally organized into pages containing user data. Currently, the most common page size is 8 KB. In addition to the 8 KB of user data, the NAND flash memory has a spare area, which may contain additional bytes that may be used for multiple purposes. First, the spare area may contain flash management information (e.g., LBA, sequence numbering, bad block indicators, etc.), which is generally referred to as the page meta data. Next, the spare area may contain error correction code (ECG) parity and/or end to end data integrity check (EDC) information. The ECC parity may be used for data protection (e.g., detection and correction of errors) of the user data and the meta data. In one example, apart from the 8 KB user data, there may be an additional spare area of 512 bytes that may be shared between the meta data, the ECC, and the EDC.

A physical page may comprise a number of regions. A flash media controller in accordance with embodiments of the present invention may use traditional page regioning, but allow the regioning to be configurable (e.g., via registers, etc.). In one example, regions may be arranged using a region layout 400. In another example, regions may be arranged using a region layout 410.

When the region layout 400 is used, each region may include a user data field 402, followed by an area of meta data 404, followed by a region of ECC 406. The ECC 406 generally protects both the user data 402 and the meta data 404. The size of the region 400 is generally configurable, as is the size of the user data 402 and the meta data 404. The size of the ECC area 406 then follows from the sizes of the user data 402 and the meta data 404. A flash media controller implemented in accordance with an embodiment of the present invention generally supports abutted page regioning as in the conventional page format structure. Abutted page regioning refers to the abutting of multiple regions. However, the regions are not tied to a power-of-two size; the regions may be of any size. By allowing the regions to be of any size, the flash media controller implemented in accordance with an embodiment of the present invention may support larger sectors, DIF, CRC, and/or additional meta data. In general, all of the sizes are programmable.

When the region layout 410 is used, each region may include a first field 412 and a second field 414. The first field 412 generally contains host sector data, which may be either raw, scrambled (if enabled), and/or encrypted (if enabled). In one example, a size of the user data may be 512/1K/2K/4K bytes plus n dwords, where n ranges, for example, from 0 to 32. In one example, a current LBA may be used for seeding for scrambler and encryption engines. The second field 414 may contain the flash management information (e.g., LBA, sequence numbering, bad block indicators, etc.), which is generally referred to as the page meta data. Using the region layout 410, there are two ways in which the meta data may be placed in the physical page, (1) the meta data is distributed across the regions, (2) the entire meta data is placed only in the last region. When the meta data is distributed across the regions, the meta data is generally treated as part of the region. The size of the region is generally configurable, as is the size of the user data and meta data. In one example, the size of the user data and the meta data may be programmable (e.g., via registers). In general, the firmware is responsible for ensuring that the sizes programmed are within the limits of the physical page size.

Figure 12A:
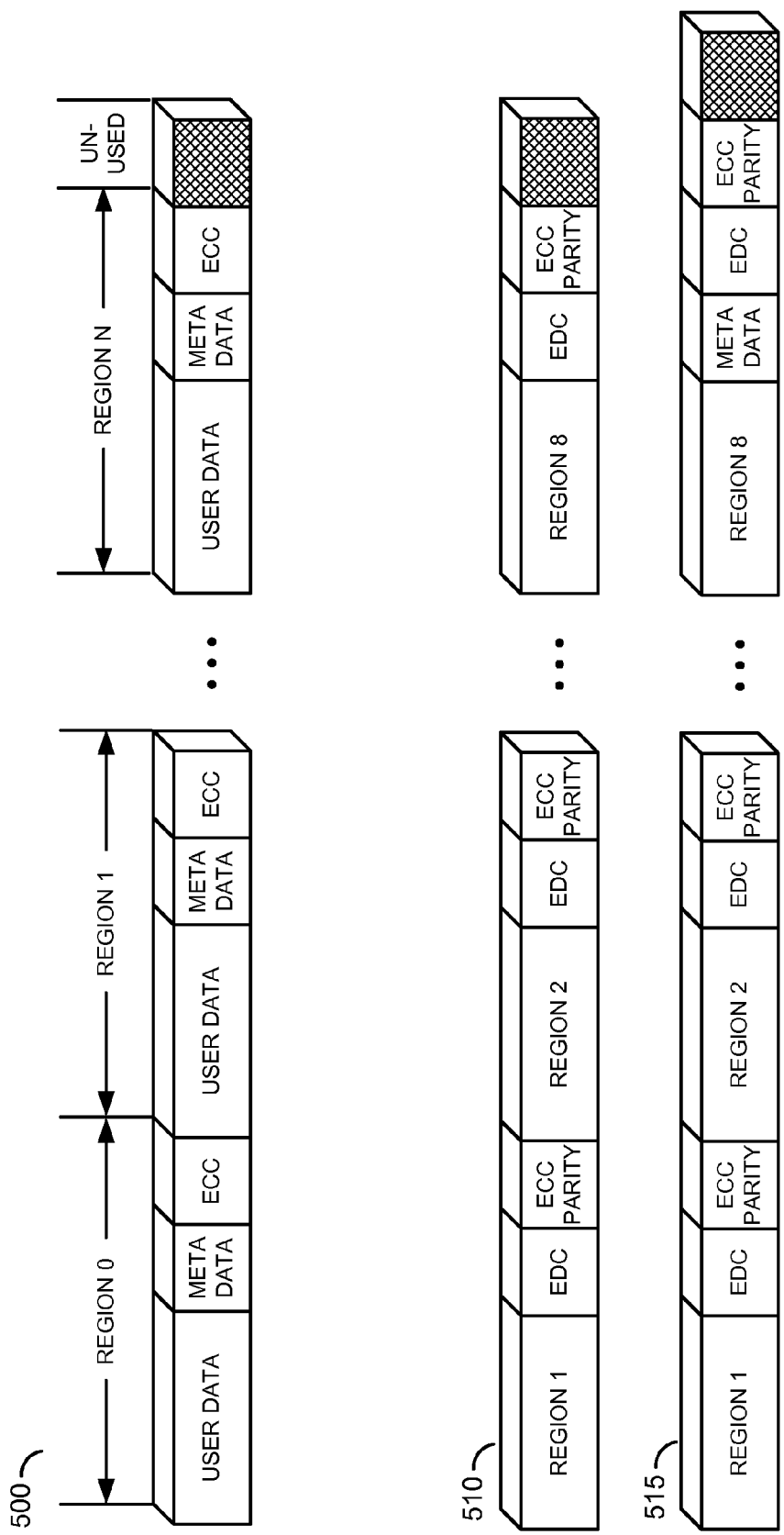
FIGS. 12A and 12B are diagrams illustrating example FMC flash page structures in accordance with embodiments of the present invention.
Figure 12B:
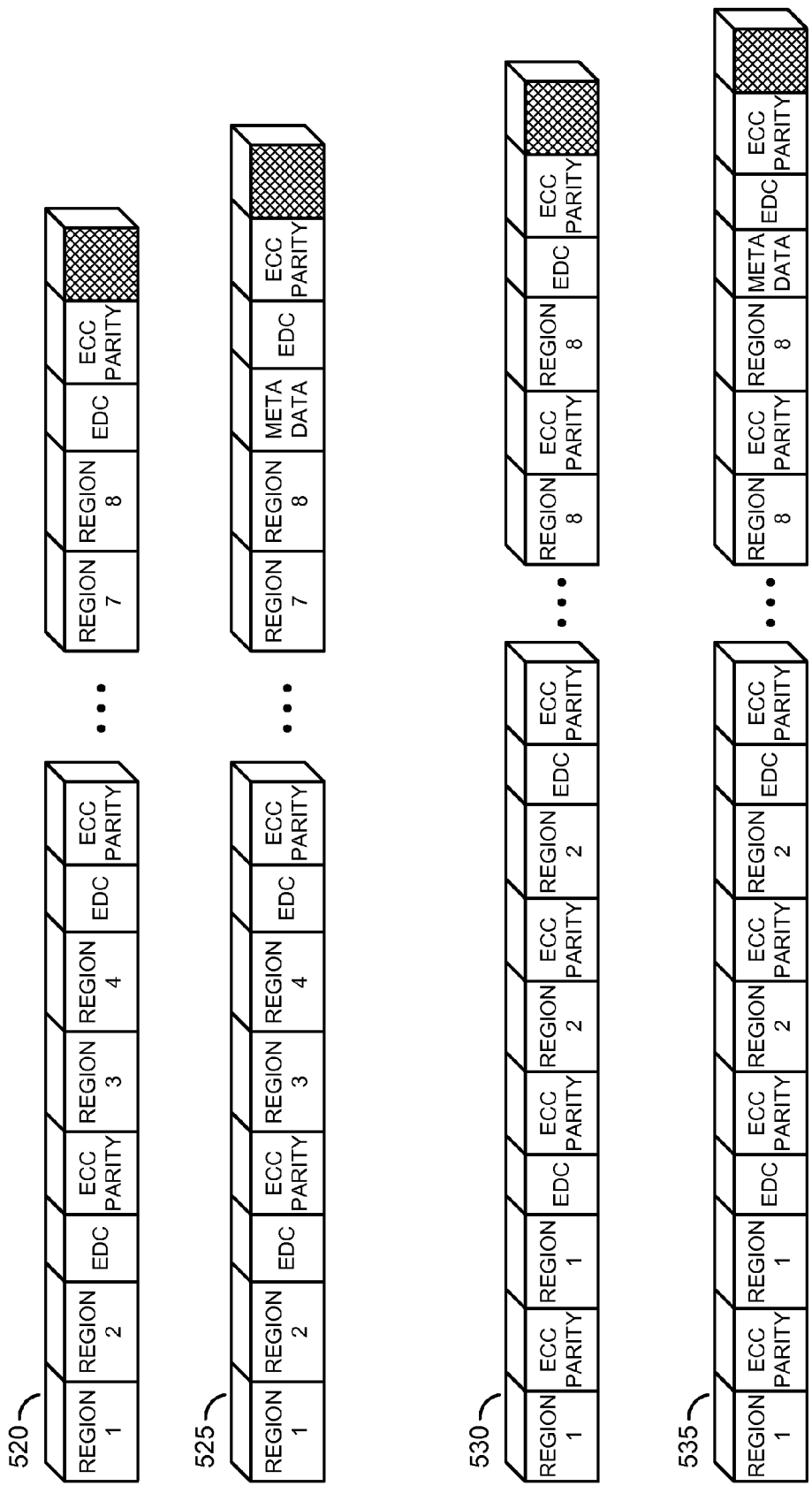

Referring to FIGS. 12A and 12B, diagrams are shown illustrating example flash page structures. A flash media controller implemented in accordance with an embodiment of the present invention generally uses traditional page regioning, but allows the page regioning to be configurable (e.g., via registers). In one example, a flash page structure 500 may be implemented using the region layout 400. In another example, a number of flash page structures 510, 515, 520, 525, 530, 535 may be implemented using the region layout 410.

In one example, meta data may be presented from left to right in the meta data areas of the regions in the page structure 500. For example, with a flash device having a page size of 8 Kbytes and a spare area of 512 bytes, a host sector size of 512 bytes may be accommodated with 16 regions, with each region having a maximum of 544 bytes. In one example, each region may comprise 512 bytes of user data, four (4) bytes of meta data, and up to 28 bytes for ECC. If the total meta data count was 28 bytes, four bytes of meta data would go into the meta data areas of each of the first seven regions and the remaining nine meta data areas (e.g., in regions 7-15) would be stuffed with zeroes or left available for other uses. When the data DMA interface port is processing the page, the data DMA interface port keeps track of the progress in processing of the page so that the data DMA interface port knows where to begin inserting and collecting meta data and knows where the codeword boundary, which is also the region boundary, is located. While the region size is programmable, the region size should not be made larger than the largest codeword with which the ECC codec is able to work. For example, BCH ECC supports up to 48-bit correction for 1K+80 information words. For each correction bit, 16-bit parity is added.

Using the region layout 410, a variety of flash page structures 510, 515, 520, 525, 530, 535 may be implemented. In one example, the flash page may be divided into 8 regions, where each of the regions is configured using the region layout 410. The unused spare area in the flash page may be utilized in two ways. In a first example, the meta data may be distributed across the regions as part of the regions (illustrated by structures 510, 520, 530). In a second example, the entire meta data may be placed only in the last region of the page (illustrated by structures 515, 525, 535). In a first example (illustrated by structures 510 and 515), an information word of LDPC is equal to the host sector size. In this example, all regions have separate EDC and ECC parity areas attached. The EDC is seeded with the BA of the host sector within the region. In a second example (illustrated by structures 520 and 525), the information word of LDPC is greater than the host sector size. In this example, every two regions have a separate EDC and ECC parity attached. The EDC is seeded with the LBA of the last host sector within the region. In a third example (illustrated by structures 530 and 535), the information word of LDPC is less than the host sector size. In this example, within one region there are two ECC parity attached and one EDC attached. The EDC is seeded with the LBA of the host sector within the region. Since the page regioning is configurable, other page structures may be implemented accordingly to meet the design criteria of a particular implementation.

Figure 13:
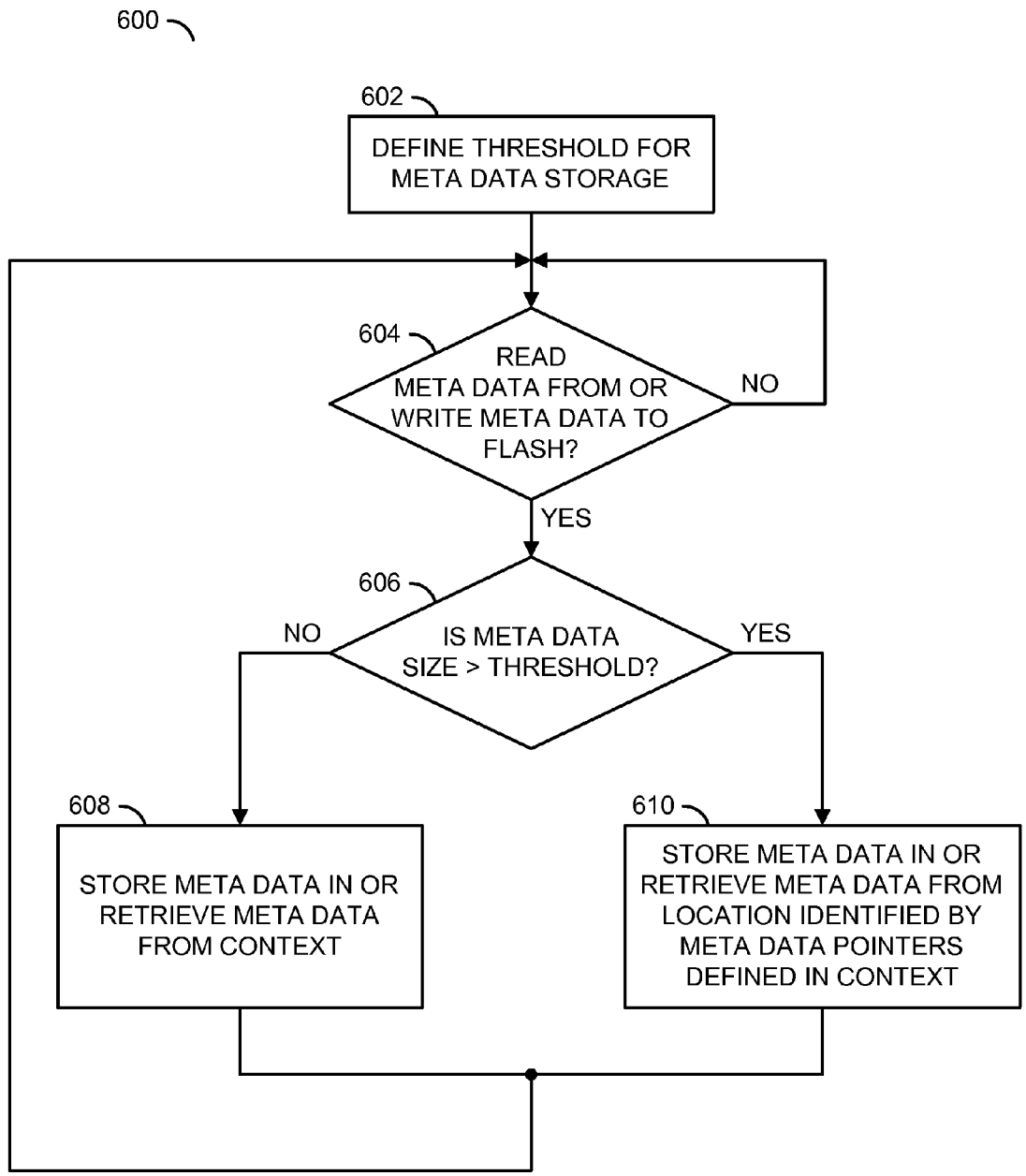
FIG. 13 is a flow diagram illustrating a process in accordance with an embodiment of the present invention.

Referring to FIG. 13, a flow diagram is shown illustrating a process 600 in accordance with an embodiment of the present invention. The process (or method) 600 generally provides steps for handling meta data in accordance with an embodiment of the present invention. In one example, the process 600 may comprise a step (or state) 602, a step (or state) 604, a step (or state) 606, a step (or state) 608, and a step (or state) 610. In the step 602, the process 600 may define a threshold value corresponding to a predefined meta data size that may be stored in a context. In the step 604, the process 600 may wait for a request to read meta data from or write meta data to a flash device. When a read or write operation is to be performed, the process 600 may move to the step 606. In the step 606, the process 600 may determine whether the meta data size is greater than the predefined threshold. When the meta data size is greater than the predefined threshold, the process 600 may move to the step 608. When the meta data size is less than or equal to the predefined threshold, the process 600 may move to the step 610.

In the step 608, the process 600 may store meta data read from the flash device in the context structure associated with the read transaction (e.g., via the contexts update port (CUP) 168) or retrieve meta data to be programmed into the flash device from the context structure associated with the write transaction (e.g., via the contexts retrieval port (CRP) 166 and BC_RD_I/F). In the step 610, the process 600 may store meta data read from the flash device in a location (e.g., in the external system buffer) identified by meta data pointers defined in the context structure associated with the read transaction or retrieve meta data to be programmed into the flash device from the location (e.g., in the external system buffer) identified by the meta data pointers defined in the context structure associated with the write transaction. For example, during the program command the meta data would be retrieved via a respective data DMA read interface port (DDRIP) 172a-172n and BC_RD_I/F, and during the read command the meta data would be updated via a respective data DMA write interface port (DDWIP) 174a-174n and BC_WR_I/F. Upon completing the transaction in either the step 608 or the step 610, the process 600 may return to the step 604.

A flash media controller (FMC) in accordance with an embodiment of the present invention generally provides various methods for handling meta data storage on a system buffer and/or a flash media controller. The flash media controller in accordance with an embodiment of the present invention may include the following features for meta data handling. Meta data information may be defined on a per context basis, where contexts are defined on a per page basis. When the meta data size is less than or equal to a predefined threshold, the complete meta data may be stored within the context structure. During a flash program cycle, meta data from the context (e.g., via the CRP 166 and BC_RD_I/F) may be stored in the flash target and during a read cycle, meta data read from the flash target may be stored back in the context structure (e.g., via the CUP 168). When the meta data size is greater than the predefined threshold, instead of storing the meta data within the context structure, meta data pointers may be defined within the context. The meta data pointers may provide address pointers to retrieve the meta data from an external system memory during a flash program cycle (e.g., via respective DDRIP and BC_RD_I/F) and to store the read data from the flash read command into a location in the external system memory indicated by the meta data pointers specified by the context (e.g., via respective DDWIP and BC_WR_I/F). In another example, the FMC may be configured such that one portion of the meta data is handled by the context while another portion of the meta data is handled by the external system memory.

The size of the meta data is generally defined by the flash transaction layer (FTL). In one example, the FTL may use roughly 12 bytes of meta data. The maximum available spare area in the context 300 illustrated in FIG. 10 is 28 bytes. Taking into account both the FTL meta data size parameter and the spare area parameter of the context 300, a predefined threshold of 28 bytes may be selected. For example, when the meta data size is less than or equal to 28 bytes, the complete meta data may be stored within the context structure within the flash lane controller of the flash media controller. During a flash program cycle, the meta data from the context may be stored in the flash target and during a read cycle, the meta data read from the flash target may be stored back in the context structure. When the meta data size is greater than 28 bytes, instead of storing the meta data within the context structure, the flash lane controller would define meta data pointers within the context that point to a location in external memory where the meta data is stored. In a case where page size is a multiple of the host size (e.g., as illustrated in FIG. 12), the meta data is generally distributed with each of the host user data. For example, for a page size of 1K bytes and a host size of 1024 bytes, during the flash program command, 28 bytes from the context may be distributed between two host user data (e.g., 14 bytes of meta data to each user data):

Host User Data 1 (512 bytes)+Metadata1 (14 bytes)+ECC+Host User Data 2 (512 bytes)+Metadata2 (14 bytes)+ECC.

The meta data is generally protected by the use of ECC. The use of ECC generally provides integrity checks and correction over the meta data portion.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

The functions performed by the diagrams of FIGS. 1-9 and 13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. A method for handling meta data stored in a page of a flash memory within a flash media controller, said method comprising:
    defining a context on a per page basis, wherein said context comprises a data structure providing all information needed by the flash media controller to execute a flash transaction and any associated transfer to or from a system buffer, said data structure including one or more fields defined for meta data associated with said flash transaction;
    defining said meta data on a per context basis;
    when a size of said meta data associated with said flash transaction is less than or equal to a predefined threshold, storing said meta data associated with said flash transaction completely within the one or more fields defined for meta data in the data structure of the context, wherein during a flash program cycle, said meta data from the data structure of the context is stored in a flash target and during a read cycle, the meta data read from the flash target is stored back in the data structure of the context; and
    when the size of said meta data associated with said flash transaction is greater than the predefined threshold, defining meta data pointers identifying a location external to said context where the meta data associated with the flash transaction is or is to be stored and storing the meta data pointers in the one or more fields defined for meta data within the data structure of the context.

2. The method according to claim 1, further comprising: protecting said meta data using an error correction code.

3. The method according to claim 1, wherein said meta data comprises management data.

4. The method according to claim 1, wherein said predefined threshold specifies a number of bytes per page.

5. The method according to claim 1, wherein the meta data pointers provide address pointers to retrieve the meta data from an external system memory during a flash program cycle and to store the meta data from the flash read command into the external system memory at a location indicated by the meta data pointers specified by the context.

6. The method according to claim 1, wherein:
    during a flash program cycle, a first portion of meta data to be stored in a flash target comes from the data structure of the context and a second portion of the meta data to be stored in a flash target comes from a location in an external system memory indicated by the meta data pointers specified by the context; and
    during a read cycle, the first portion of the meta data read from the flash target is stored back in the data structure of the context and the second portion of the meta data read from the flash is stored in the external system memory at a location indicated by the meta data pointers specified by the context.

7. The method according to claim 1, wherein when a page size is a multiple of a host sector size, the meta data is distributed among each of a plurality of host user data sectors.

8. An apparatus comprising:
a flash memory comprising a plurality of flash media devices, said flash memory being organized as a plurality of pages;
a flash media controller configured to store meta data in one or more pages of said flash memory, wherein (i) said flash media controller defines a context on a per page basis and said meta data on a per context basis, (ii) the context comprises a data structure providing all information needed by the flash media controller to execute a flash transaction and any associated transfer to or from a system buffer, (iii) said data structure includes one or more fields defined for meta data associated with said flash transaction, (iv) when a size of said meta data associated with said flash transaction is less than or equal to a predefined threshold, said flash media controller stores the complete meta data within the one or more fields defined for meta data in the data structure of the context, such that during a flash program cycle said flash media controller stores the meta data from the data structure of the context in a flash target and during a read cycle said flash media controller stores the meta data read from the flash target back into the data structure of the context, and (v) when the size of the meta data associated with said flash transaction is greater than the predefined threshold, said flash media controller defines meta data pointers identifying a location external to said context where the meta data associated with the flash transaction is or is to be stored and stores the meta data pointers in the one or more fields defined for meta data within the data structure of the context.

9. The apparatus according to claim 8, wherein said flash media controller protects said meta data using an error correction code.

10. The apparatus according to claim 8, wherein said meta data comprises management data.

11. The apparatus according to claim 8, wherein the predefined threshold defines a number of bytes per page.

12. The apparatus according to claim 8, wherein the meta data pointers provide address pointers used by the flash media controller to retrieve the meta data from an external system memory during a flash program cycle and to store the meta data from the flash read command into the external system memory at a location indicated by the meta data pointers specified by the context.

13. The apparatus according to claim 8, wherein
during a flash program cycle, a first portion of meta data to be stored in a flash target comes from the data structure of the context and a second portion of the meta data to be stored in a flash target comes from a location in an external system memory indicated by the meta data pointers specified by the context; and
during a read cycle, the first portion the meta data read from the flash target is stored back in the data structure of the context and the second portion is stored in the external system memory at a location indicated by the meta data pointers specified by the context.

14. The apparatus according to claim 8, wherein the flash media controller is further configured to distribute the meta data among each of a plurality of host user data sectors when a page size of said flash memory is a multiple of a host sector size.

15. A flash memory system comprising:
means for defining meta data on a per context basis, where a context is defined on a per page basis, said context comprises a data structure providing all information needed by said defining means to execute a flash transaction and any associated transfer to or from a system buffer, and said data structure includes one or more fields defined for meta data associated with said flash transaction;
means for storing the complete meta data associated with said flash transaction within the one or more fields defined for meta data within the data structure of the context when a size of said meta data associated with said flash transaction is less than or equal to a predefined threshold, wherein during a flash program cycle, said meta data from the data structure of the context is stored in a flash target and during a read cycle, the meta data read from the flash target is stored back in the data structure of the context; and
means for defining meta data pointers identifying a location external to said context where the meta data associated with the flash transaction is or is to be stored and storing the meta data pointers in the one or more fields defined for meta data within the data structure of the context when the size of the meta data associated with said flash transaction is greater than the predefined threshold.

* * * * *